(12) United States Patent
Tanaka

(10) Patent No.: US 6,750,424 B2
(45) Date of Patent: Jun. 15, 2004

(54) BEAM HOMOGENIZER, LASER IRRADIATION APPARATUS, LASER IRRADIATION METHOD, AND METHOD OF MANUFACTURING SEMICONDUCTOR DEVICE

(75) Inventor: Koichiro Tanaka, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 5 days.

(21) Appl. No.: 09/843,714

(22) Filed: Apr. 30, 2001

(65) Prior Publication Data

US 2001/0029089 A1 Oct. 11, 2001

Related U.S. Application Data

(62) Division of application No. 09/350,178, filed on Jul. 9, 1999, now Pat. No. 6,246,524.

(30) Foreign Application Priority Data

Jul. 13, 1998 (JP) .......................... 10-197884
May 24, 1999 (JP) .......................... 11-144059

(51) Int. Cl.[7] .................. B23K 26/06; B23K 26/00; G02B 27/10
(52) U.S. Cl. ............... 219/121.75; 219/121.6; 219/121.61; 219/121.8; 219/121.76; 372/24; 359/619; 359/621; 359/623; 250/492.1
(58) Field of Search .............. 219/121.75, 121.6, 219/121.61–121.74, 121.8, 121.63, 121.65, 121.67, 121.7, 121.76; 372/21–24; 355/68; 359/619–623

(56) References Cited

U.S. PATENT DOCUMENTS 3,670,260 A * 6/1972 Koester et al. .............. 372/9

| 4,262,208 A | | 4/1981 | Suzki et al. |
| 4,734,550 A | * | 3/1988 | Imamura et al. ....... 219/121.61 |
| 4,851,978 A | | 7/1989 | Ichihara |
| 4,861,964 A | | 8/1989 | Sinohara |
| 4,937,459 A | | 6/1990 | Ina |
| 4,942,588 A | | 7/1990 | Yasui et al. |
| 5,059,013 A | | 10/1991 | Jain |
| RE33,947 E | | 6/1992 | Shinohara |
| 5,561,081 A | | 10/1996 | Takenouchi et al. |
| 5,591,668 A | | 1/1997 | Maegawa et al. |
| 5,608,492 A | * | 3/1997 | Sato ........................... 355/68 |
| 5,643,826 A | | 7/1997 | Ohtani et al. |
| 5,708,252 A | | 1/1998 | Shinohara et al. |

(List continued on next page.)

FOREIGN PATENT DOCUMENTS

| JP | 03-226392 | | 10/1991 |
| JP | 6-244104 | | 9/1994 |
| JP | 7-130652 | | 5/1995 |
| JP | 11-102862 A | * | 4/1999 |
| JP | 11-133463 | | 5/1999 |

OTHER PUBLICATIONS

European Search Report dated Jun. 4, 2002.
Specification, drawings, abstract and pending claims of U.S. Ser. No. 09/481,396 entitled *Laser Irradiation Apparatus*, filed Jan. 12, 2000.

*Primary Examiner*—L. Edmondson
(74) *Attorney, Agent, or Firm*—Eric J. Robinson; Robinson Intellectual Property Law Office, P.C.

(57) ABSTRACT

A laser process in which stripe formation due to laser annealing is prevented and uniform laser annealing is made over the whole surface of a substrate. A laser beam having an energy distribution with an edge which has a nearly vertical shape 1 used, and when scanning of the laser beam is carried out, the scanning is carried out while the edge having the nearly vertical shape is made the front of the scanning.

15 Claims, 24 Drawing Sheets

U.S. PATENT DOCUMENTS

| | | | |
|---|---|---|---|
| 5,721,416 A | * 2/1998 | Burghardt et al. | 219/121.73 |
| 5,798,784 A | 8/1998 | Nonaka et al. | |
| 5,815,494 A | * 9/1998 | Yamazaki et al. | 372/24 |
| 5,858,473 A | 1/1999 | Yamazaki et al. | |
| 5,858,822 A | 1/1999 | Yamazaki et al. | |
| 5,879,977 A | 3/1999 | Zhang et al. | |
| 5,897,799 A | 4/1999 | Yamazaki et al. | |
| 5,900,980 A | * 5/1999 | Yamazaki et al. | 359/619 |
| 5,923,960 A | 7/1999 | Harvey | |
| 5,923,962 A | 7/1999 | Ohtani et al. | |
| 5,959,779 A | 9/1999 | Yamazaki et al. | |
| 5,968,383 A | 10/1999 | Yamazaki et al. | |
| 6,002,101 A | 12/1999 | Yamazaki et al. | |
| 6,002,523 A | 12/1999 | Tanaka | |
| 6,008,144 A | 12/1999 | Shih et al. | |
| 6,038,075 A | 3/2000 | Yamazaki et al. | |
| 6,061,375 A | 5/2000 | Zhang et al. | |
| 6,100,961 A | 8/2000 | Shiraishi et al. | |
| 6,104,535 A | 8/2000 | Tanaka | |
| 6,136,632 A | * 10/2000 | Higashi | 257/353 |
| 6,137,633 A | 10/2000 | Tanaka | |
| 6,157,492 A | 12/2000 | Yamazaki et al. | |
| 6,159,777 A | 12/2000 | Takenouchi et al. | |
| 6,160,827 A | 12/2000 | Tanaka | |
| 6,168,968 B1 | * 1/2001 | Umemoto et al. | 136/244 |
| 6,176,926 B1 | 1/2001 | Tanaka | |
| 6,184,490 B1 | * 2/2001 | Schweizer | 219/121.77 |
| 6,212,012 B1 | 4/2001 | Tanaka | |
| 6,215,595 B1 | 4/2001 | Yamazaki et al. | |
| 6,239,913 B1 | 5/2001 | Tanaka | |
| 6,246,524 B1 | * 6/2001 | Tanaka | 359/619 |
| 6,249,385 B1 | 6/2001 | Yamazaki et al. | |
| 6,259,512 B1 | * 7/2001 | Mizouchi | 355/53 |
| 6,261,856 B1 | 7/2001 | Shinohara et al. | |
| 6,291,320 B1 | 9/2001 | Yamazaki et al. | |
| 6,300,176 B1 | 10/2001 | Zhang et al. | |
| 6,304,385 B1 | 10/2001 | Tanaka | |
| 6,353,218 B1 | 3/2002 | Yamazaki et al. | |
| 6,353,244 B1 | * 3/2002 | Yamazaki et al. | 257/347 |
| 6,372,039 B1 | 4/2002 | Okumura et al. | |
| 6,388,386 B1 | 5/2002 | Kunii et al. | |
| 6,392,810 B1 | * 5/2002 | Tanaka | 219/121.8 |
| 6,437,313 B2 | * 8/2002 | Yamazaki et al. | 250/216 |
| 6,507,446 B2 | * 1/2003 | Yamashita et al. | 359/811 |
| 6,528,397 B1 | 3/2003 | Taketomi et al. | |
| 2001/0015854 A1 | * 8/2001 | Yamazaki et al. | 359/623 |
| 2002/0117630 A1 | 8/2002 | Yamazaki et al. | |
| 2002/0146873 A1 | * 10/2002 | Tanaka | 438/166 |
| 2002/0151121 A1 | 10/2002 | Tanaka | |
| 2003/0042430 A1 | * 3/2003 | Tanaka et al. | 250/492.1 |

\* cited by examiner

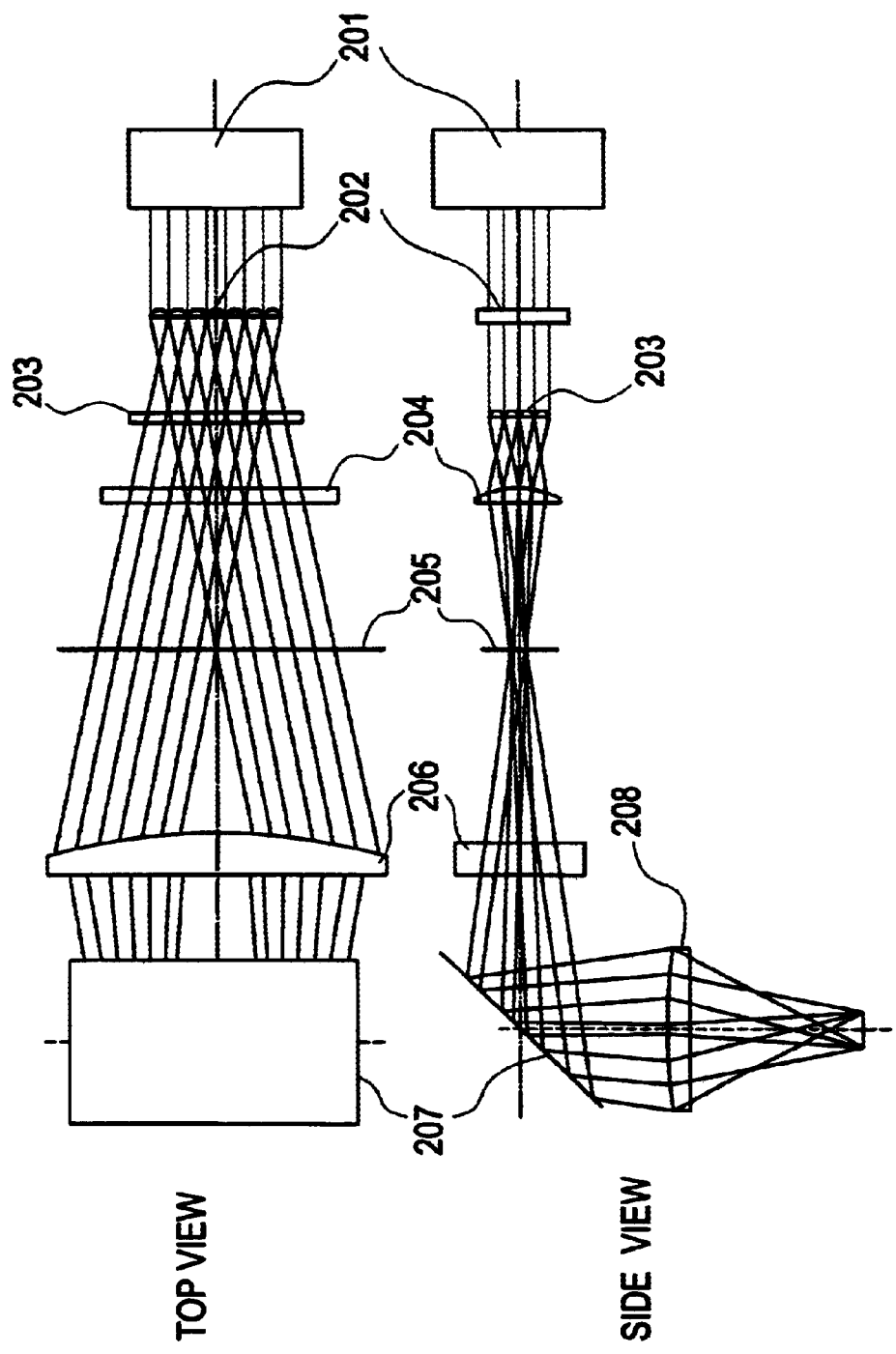

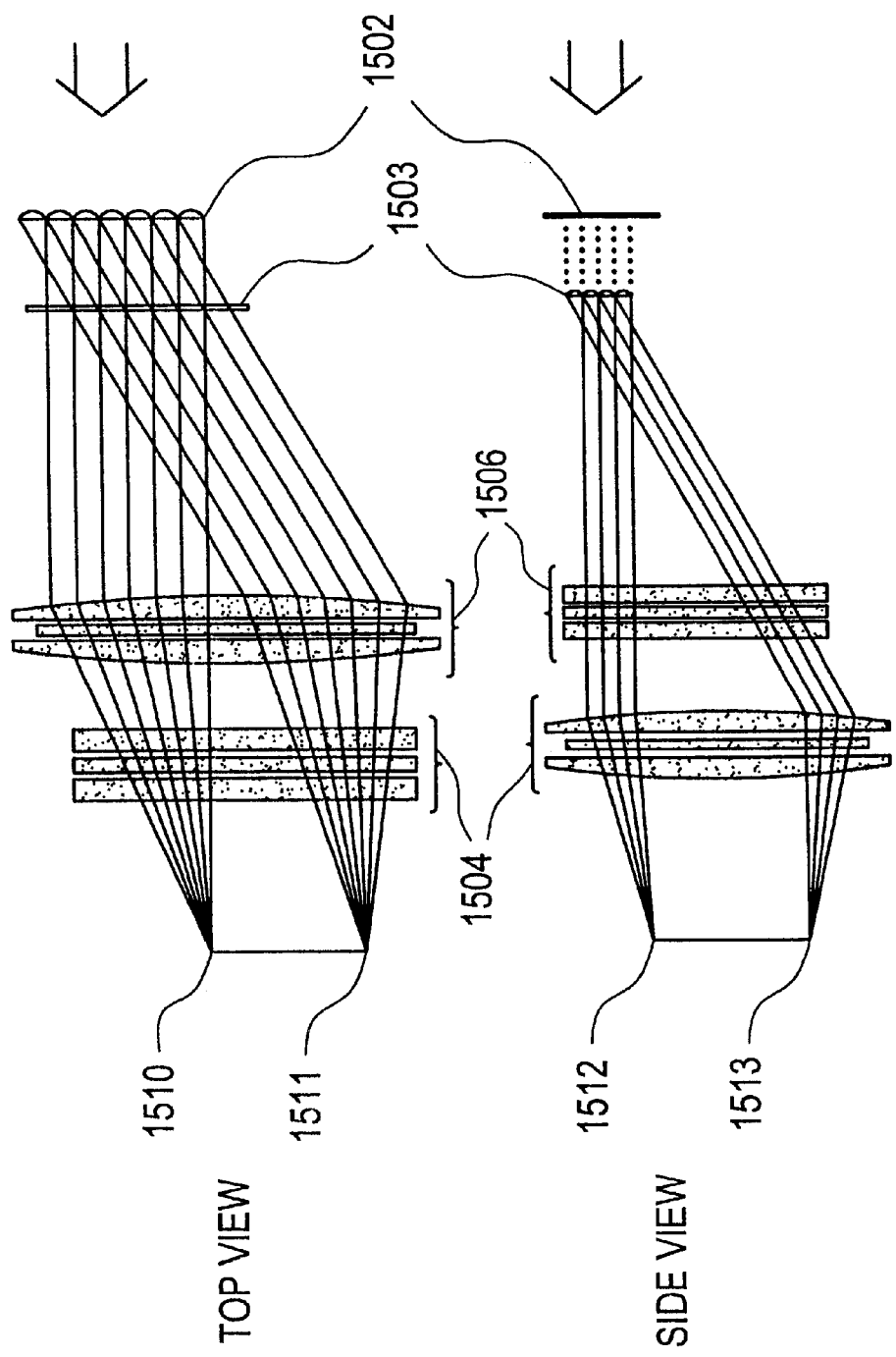

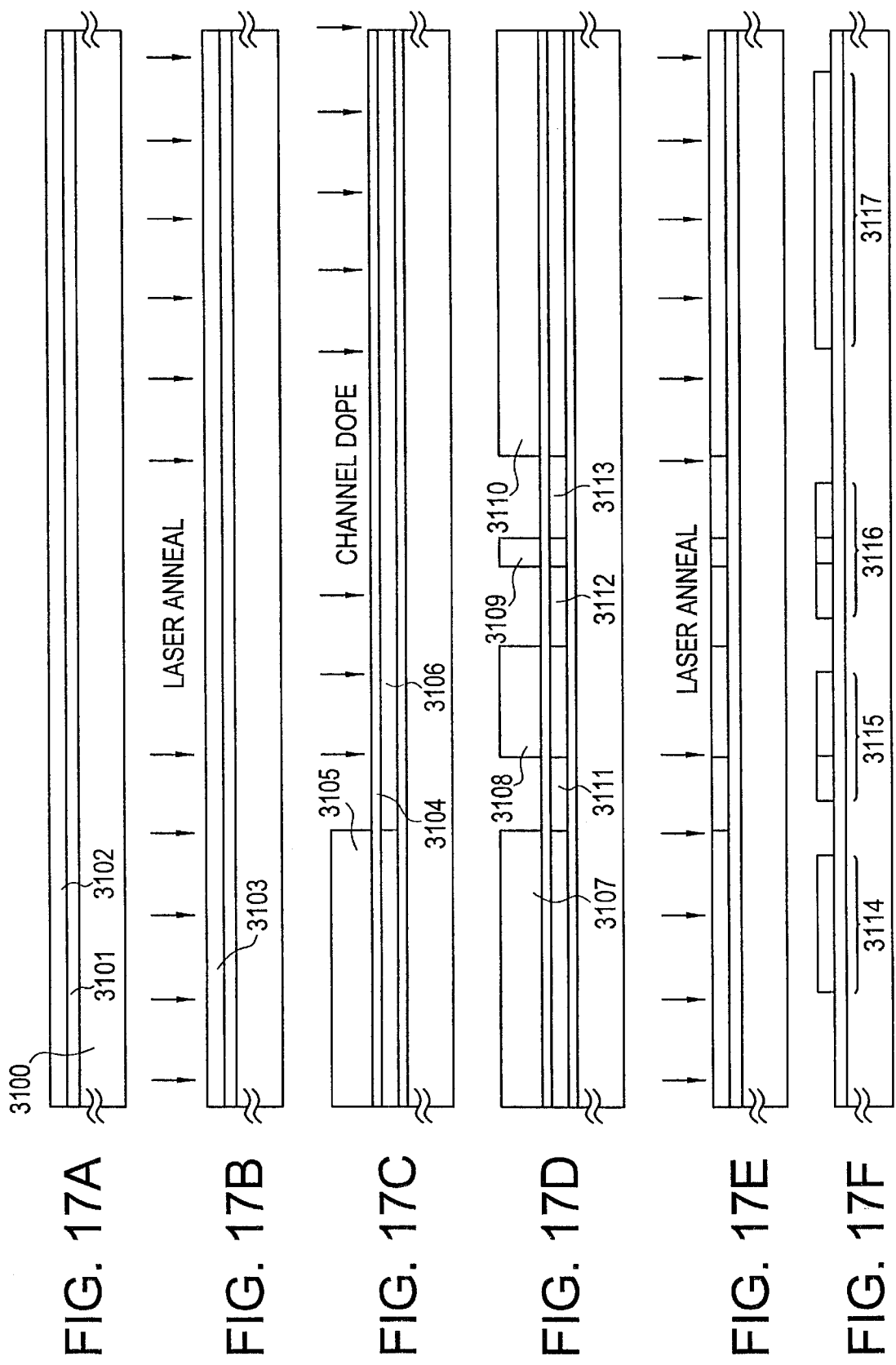

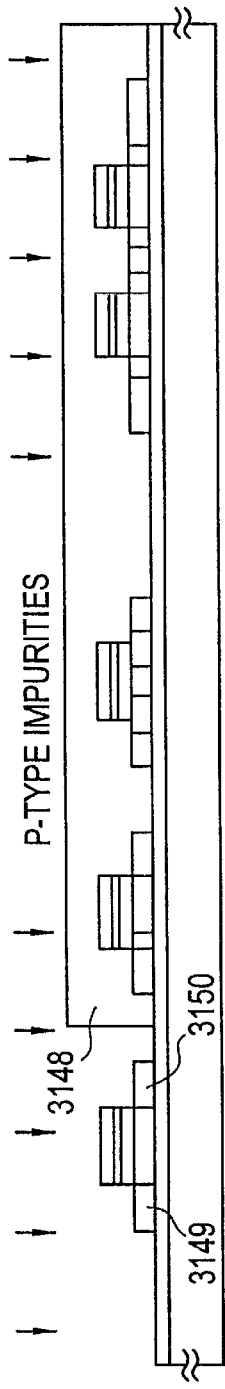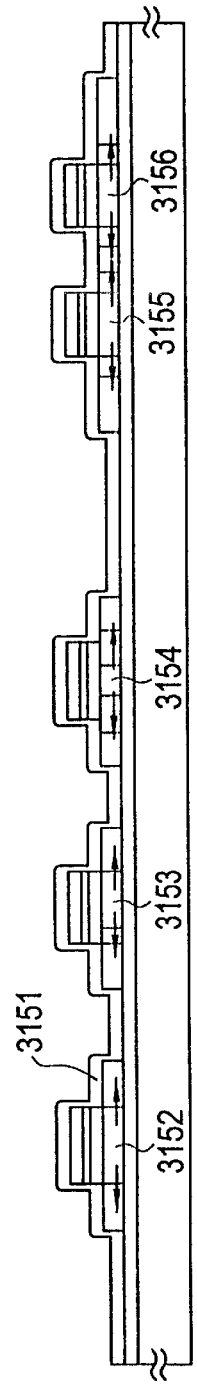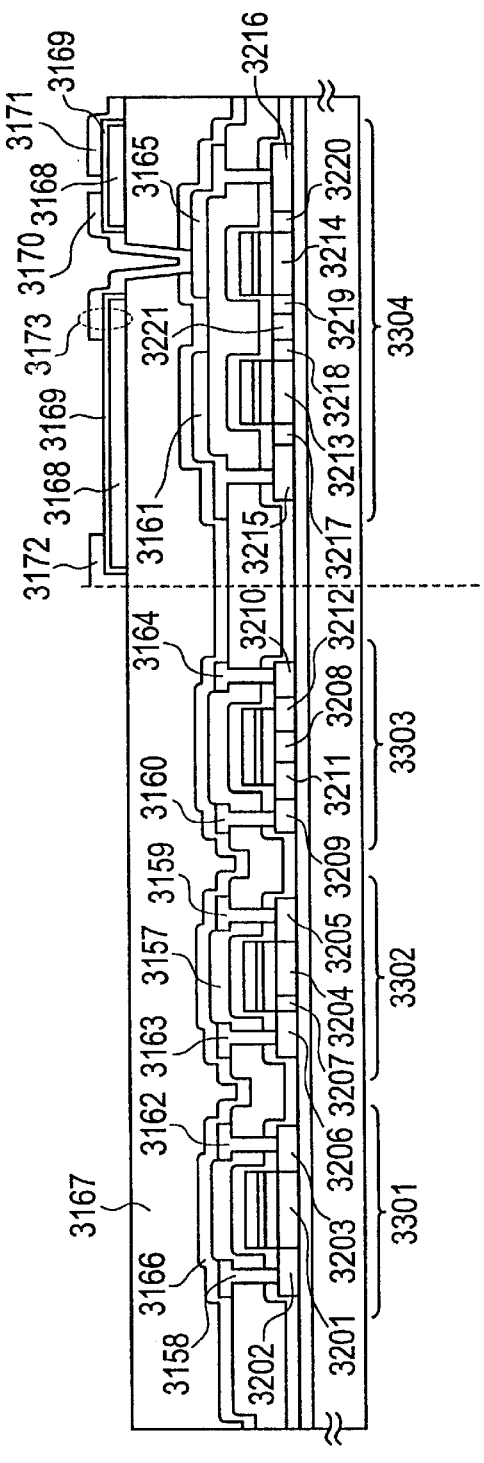

BEAM HOMOGENIZER, LASER IRRADIATION APPARATUS, LASER IRRADIATION METHOD, AND METHOD OF MANUFACTURING SEMICONDUCTOR DEVICE

This is a division of application Ser. No. 09/350,178 filed Jul. 9, 1999 now U.S. Pat. No. 6,246,524.

BACKGROUND OF THE INVENTION

1. Field of the Invention

The present invention relates to a technique capable of irradiating a large area with a laser beam having high uniformity, and also the invention relates to an application method thereof.

2. Description of the Related Art

In recent years, a technique of laser annealing to an amorphous semiconductor film or a non-single crystal semiconductor film (a semiconductor film which is not single crystal but has crystallinity of polycrystal, microcrystal, etc.) formed on an insulating substrate such as glass to crystallize the film or improve its crystallinity, has been widely studied. As the semiconductor film, a silicon film is often used.

As compared with a quartz substrate which has been hitherto often used, a glass substrate has such merits that it is inexpensive and is rich in workability, and a large substrate can be easily formed. This is the reason why the foregoing study is carried out. Besides, the reason why a laser is preferably used for crystallization is that the melting point of the glass substrate is low. The laser can give high energy to only a non-single crystal film without greatly changing the temperature of the substrate.

Since a crystalline silicon film formed by laser annealing has a high mobility, a thin film transistor (TFT) is formed by using this crystalline silicon film, and for example, it is actively used for a monolithic liquid crystal electro-optical device in which TFTs for pixel driving and for driver circuits are formed on one glass substrate. Since a crystalline silicon film comprises a number of crystal grains, it is called a polycrystal silicon film or a polycrystal semiconductor film.

A method in which a pulse laser beam of an excimer laser or the like having high output is processed by an optical system so that a spot of several cm square or a line of several hundred μm width×several tens cm is formed on a surface to be irradiated, and the laser beam is made to scan (irradiation position of the laser beam is relatively moved to the irradiated surface) to make laser annealing, is superior in mass productivity and excellent in technology. Thus, this method is used by choice.

Particularly, when a linear laser beam is used, differently from the case of using a spot-like laser beam which requires back-and-forth and right-and-left scanning, laser irradiation to the whole irradiated surface can be made by scanning in only the direction normal to the line direction of the linear laser. Thus, high mass productivity can be obtained. The reason why scanning is made in the direction normal to the line direction is that it is the most effective scanning direction. By this high mass productivity, at present, laser annealing using the linear laser beam has become the mainstream.

When laser annealing is made to the non-crystal semiconductor film by scanning of the processed linear pulse laser beam, some problems have occurred. One of especially serious problems among them is that laser annealing is not uniformly carried out to the whole surface of the film. When the linear laser beam is used, a phenomenon in which stripes are formed at overlapped portions of the beam becomes noticeable, and semiconductor characteristics of the film are remarkably different for each of these stripes.

FIG. 1 shows the state of these stripes. When the surface of a silicon film after laser annealing is observed, these stripes appear according to the degree of reflection of light.

FIG. 1 shows the state in the case where XeCl excimer laser with a wavelength of 308 nm was made a linear laser beam extending in the right-and-left direction on the paper surface, and irradiation was made while this laser beam scanned a film in the direction from the upper portion of the paper surface to the lower portion.

In the case where an active matrix type liquid crystal display is manufactured by using a silicon film in which a stripe-like pattern as shown in FIG. 1 appears, there occurs a disadvantage that this stripe appears directly on the screen.

Although this problem has been improved by improving a non-single crystal semiconductor film of an object to be irradiated with laser, or by narrowing a scanning pitch (interval of adjacent linear laser beams) of the linear laser, it has been still insufficient.

In general, in the case where a linear laser beam is formed, an original rectangular beam is made to pass through a suitable optical system and is processed into a linear shape. Although the aspect ratio of the rectangular beam is about 2 to 5, for example, by an optical system shown in FIG. 2, it is transformed into the linear beam having an aspect ratio of 100 or more. At that time, the optical system is designed such that the distribution of energy in the beam is also homogenized at the same time.

The apparatus shown in FIG. 2 has a function to emit a laser beam, as a linear beam, from a laser beam generating unit 201 (in this state, the shape of the beam is substantially rectangular) through optical systems 202, 203, 204, 206, and 208. Incidentally, reference numeral 205 denotes a slit, and 207 denotes a mirror.

Reference numeral 202 denotes an optical lens serving to divide a laser beam in one direction, and a cylindrical lens group (also referred to as a multicylindrical lens) is used. The divided many beams are overlapped and homogenized by the cylindrical lens 206.

This structure is required to improve the strength distribution in the laser beam. The cylindrical lens group 203 also divides the laser beam in another direction, like the foregoing cylindrical lens group 202, and the divided beams are overlapped and homogenized by the cylindrical lenses 204 and 208.

That is, the combination of the cylindrical lens group 202 and the cylindrical lens 206 has a function to improve the strength distribution in the line direction of the linear laser beam, and the combination of the cylindrical lens group 203 and the cylindrical lenses 204 and 208 has a function to improve the strength distribution in the width direction of the linear laser beam.

Here, with respect to the width direction, the two cylindrical lenses 204 and 208 are used to make finer in the width direction of the linear laser beam on the irradiated surface. According to the width of the linear laser beam, the number of optical systems for overlapping is made one, or made three or more.

The optical system serving to homogenize the energy distribution in the laser beam is referred to as a beam homogenizer. The optical system shown in FIG. 2 is also one of beam homogenizers. The method of homogenizing the energy distribution is such that after the original rectangular laser beam is divided by the cylindrical lens groups 202 and 203, the divided beams are shaped and overlapped by the cylindrical lenses 206, 204 and 208 to homogenize them.

SUMMARY OF THE INVENTION

In view of the above, an object of the present invention is to improve stripe formation due to irradiation of a laser beam and to make uniform laser annealing over the whole surface of a film.

According to an aspect of the present invention, a beam homogenizer comprises an optical lens having a function to divide a laser beam in one direction; and an optical system for overlapping the divided laser beams, wherein the optical lens includes such a lens that a cylindrical lens is cut along a basic plane.

According to another aspect of the present invention, a laser irradiation apparatus comprises a laser beam generating unit; an optical lens having a function to divide a laser beam in one direction; an optical system for overlapping the divided laser beams; and a movable irradiation stage, wherein the optical lens includes such a lens that a cylindrical lens is cut along a basic plane.

According to still another aspect of the present invention, a laser irradiation method for applying a laser beam to an irradiated surface, at least one edge of an energy distribution of the laser beam at the irradiated surface having a nearly vertical shape, wherein scanning of the laser beam is carried out while the edge having the nearly vertical shape is made a front of the scanning.

BRIEF DESCRIPTION OF THE DRAWINGS

FIG. 2 is a view showing a conventional optical system and optical path for forming a linear laser beam.

FIG. 15 is a view showing an optical system and optical path of the present invention for forming a square laser beam.

FIGS. 17A to 17F are views showing manufacturing steps of a pixel circuit and a control circuit.

FIGS. 19A to 19C are views showing manufacturing steps of the pixel circuit and the control circuit.

DETAILED DESCRIPTION OF THE PREFERRED EMBODIMENTS

Preferred embodiments of the present invention will now be described with reference to the drawings.

Incidentally, a lens in the present specification means a spherical lens unless specified otherwise.

First, the process to the present invention will be described.

The present inventors changed the arrangement of the optical system shown in FIG. 2 to adjust the overlapping state of divided laser beams on the irradiated surface, so that the energy distribution of the linear laser beam was changed.

By repeatedly carrying out annealing of a semiconductor film with the linear laser beam in which its energy distribution was processed, the present inventors empirically found that the cause of the stripe formation closely related to the energy distribution of the linear laser beam in the width direction.

Figure 1:
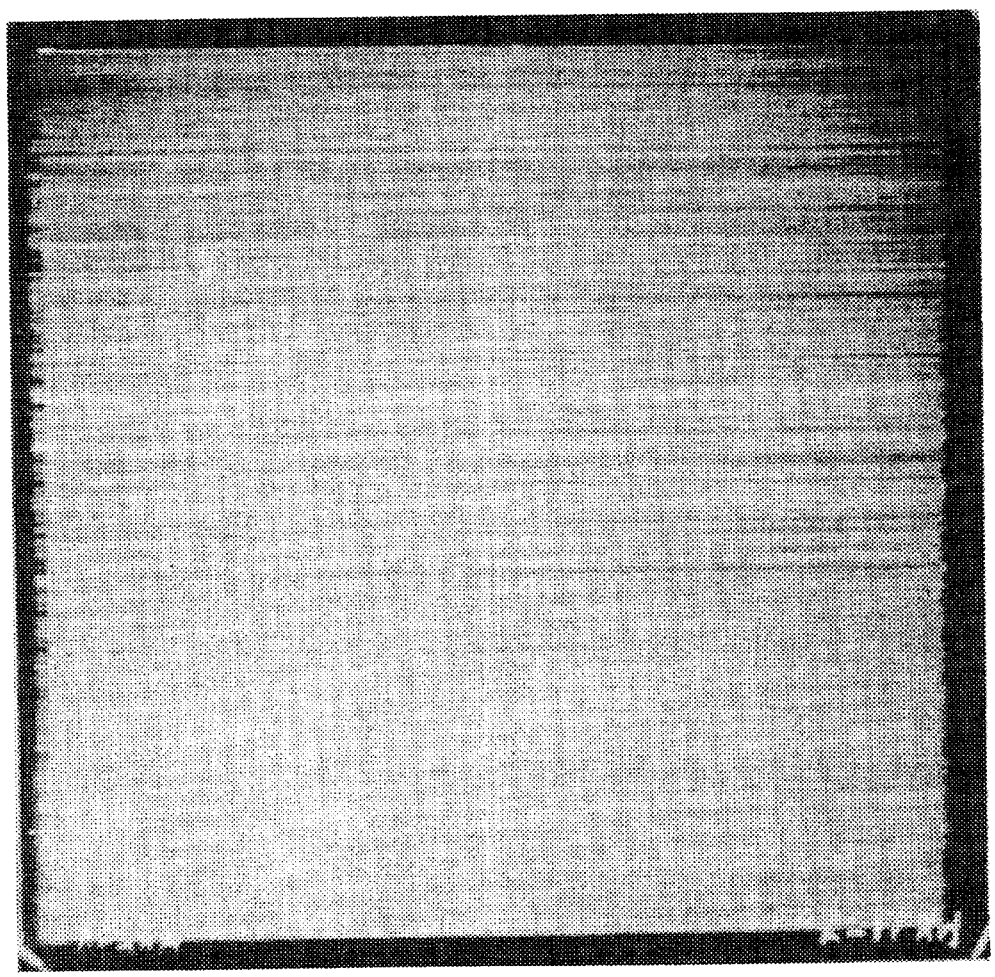
FIG. 1 is a photograph showing a silicon film laser crystallized by a linear laser beam.
Figure 3A:
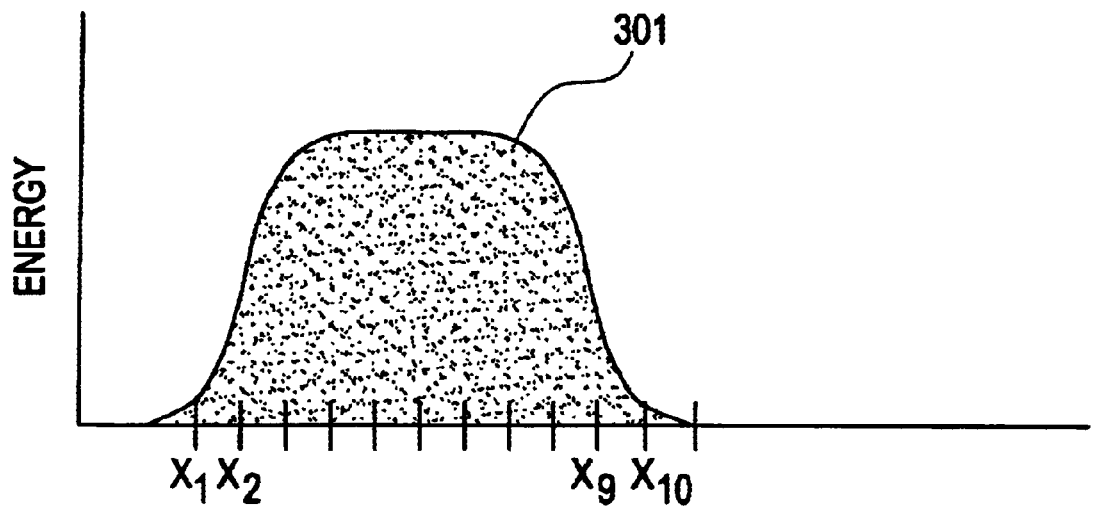
FIGS. 3A and 3B are views showing the energy distribution, in a width direction, of a linear laser beam formed by a conventional optical system, respectively.

FIG. 3A shows energy distribution in a width direction on an irradiated surface when regions $X_1$ to $X_{10}$ are laser annealed by using a conventional linear laser beam. In FIGS. 3 to 5, the vertical axis in the graph indicates the energy strength of the laser beam, and the horizontal axis indicates the width direction of the laser beam.

As shown in FIG. 3A, the conventional energy distribution 301 is such that although the vicinity of the center is uniform and has suitable energy, edge portions (indicating end portions of the energy distribution, especially the regions $X_1$ to $X_2$, and $X_9$ to $X_{10}$) show an uneven shape similar to Gaussian distribution. Here, the suitable energy means energy necessary for laser annealing of a film, and is set according to the object of the laser annealing, the quality of the film, and the like.

When the uniform and suitable energy is made the maximum energy, this uneven region is a region (blurred region) where its energy is 90% to 5% of the maximum energy, and this region in the conventional energy distribution has a width of 100 μm or more.

The present inventors found that the stripe pattern was formed by the edge portions in which the energy distribution was uneven.

Figure 3B:
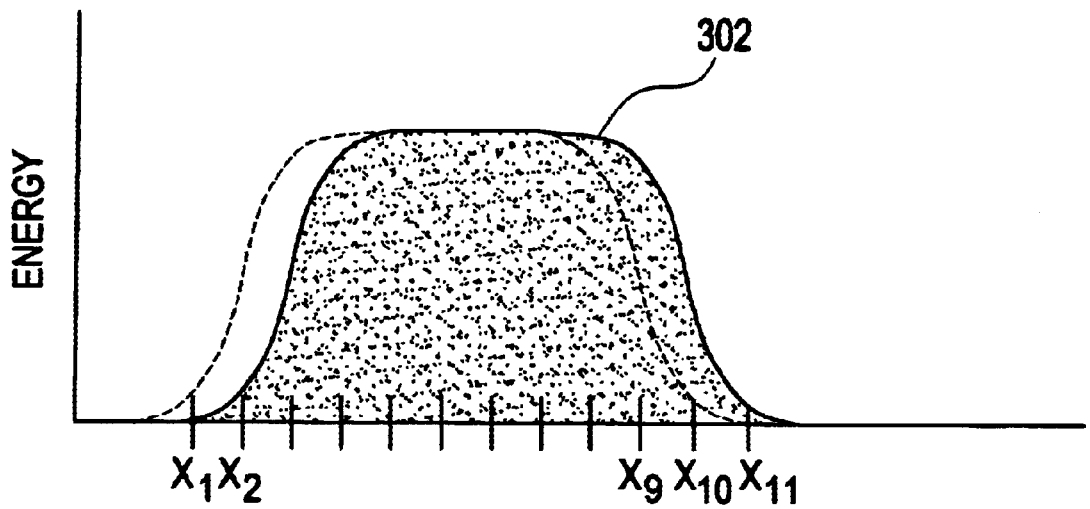

When scanning of the linear laser beam is carried out, a next laser beam is applied to the positions $X_2$ to $X_{11}$ shifted in the width direction by 1/10 to 1/20, for example, 1/10 of the width of the laser beam as indicated by 302 in FIG. 3B. When the scanning width was made larger than 1/10, the stripe became especially noticeable. By repeating this process, the irradiated surface receives irradiation of the laser beam 10 to 20 time and is laser annealed.

Here, as shown in the portions $X_9$ to $X_{10}$ in FIG. 3A, if the portions are first irradiated with the laser beam having the uneven energy distribution, even if the portions are subsequently irradiated with the uniform and suitable energy laser beam, they are unevenly laser annealed.

By further repeating experiments, the present inventors found that the effect of laser annealing was almost determined by first several times (about five times although it is changed by laser energy) of laser irradiation.

That is, when the uniform and suitable energy laser irradiation is first repeated several times to the same place, uniform laser annealing can be made. Even if laser irradiation of the uneven energy distribution with energy lower than the suitable energy was applied to the place thereafter, it was hard to receive the influence.

The foregoing law can also be realized for not only a pulse laser such as an excimer laser, but also a continuous-wave laser such as an Ar laser or YAG laser.

The present invention is characterized in that when laser beam scanning is carried out, the scanning is made in such a manner that an edge of the beam where an energy distribution at an irradiated surface is nearly vertical is made the front of the scanning.

Figure 4A:
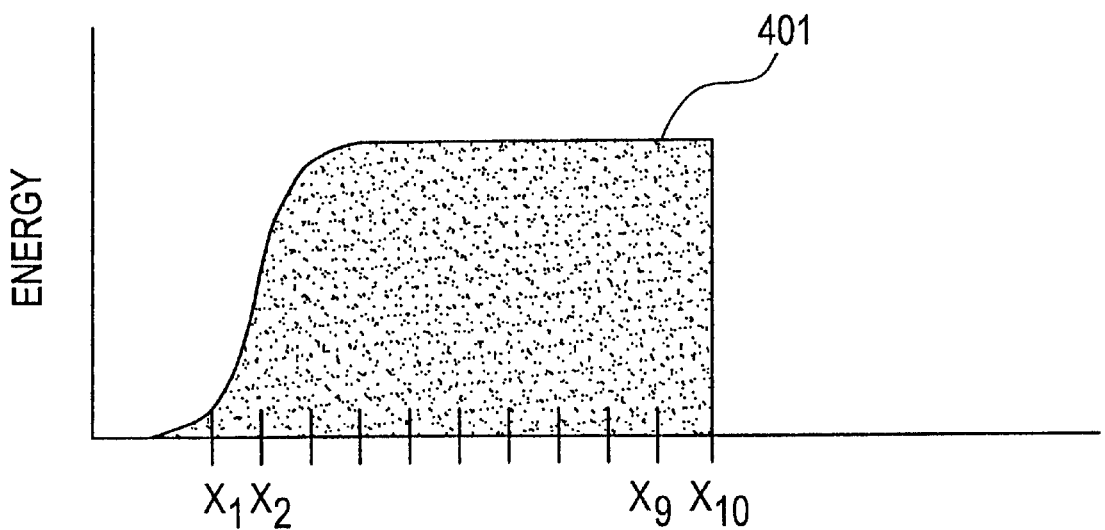
FIGS. 4A and 4B are views showing the energy distribution, in a width direction, of a linear laser beam formed by an optical system of the present invention, respectively.
Figure 5A:
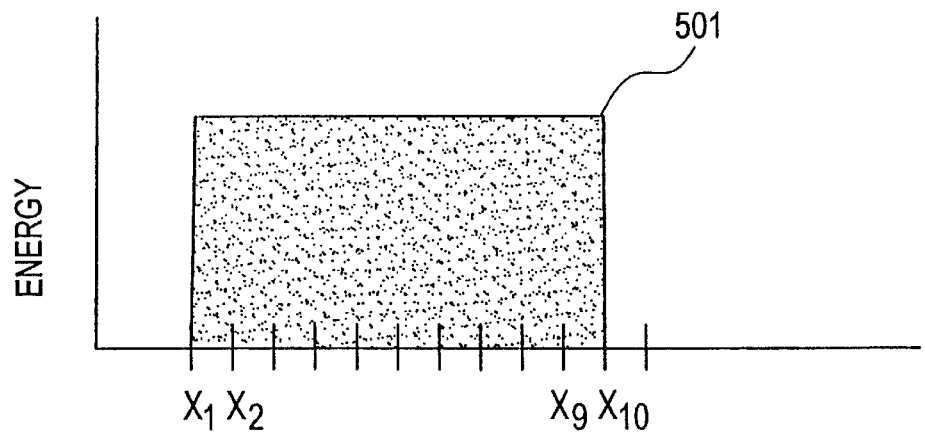
FIGS. 5A to 5C are views showing the energy distribution, in a width direction, of a linear laser beam formed by an optical system of the present invention, respectively.
Figure 5B:
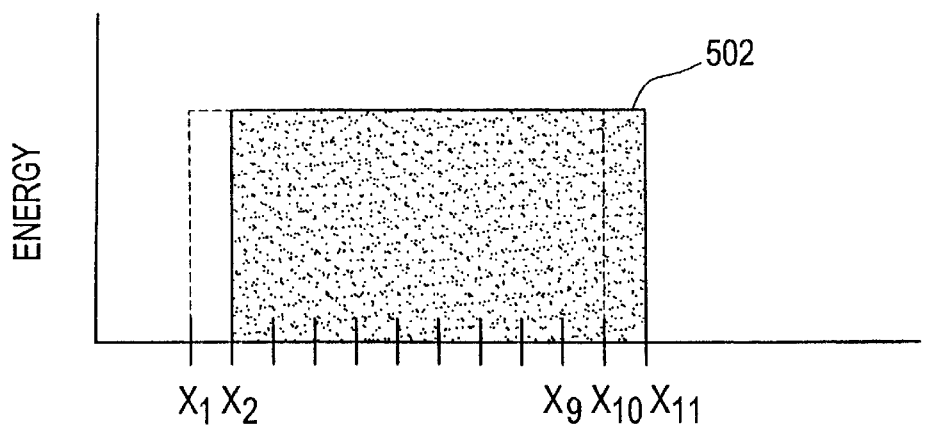
Figure 5C:
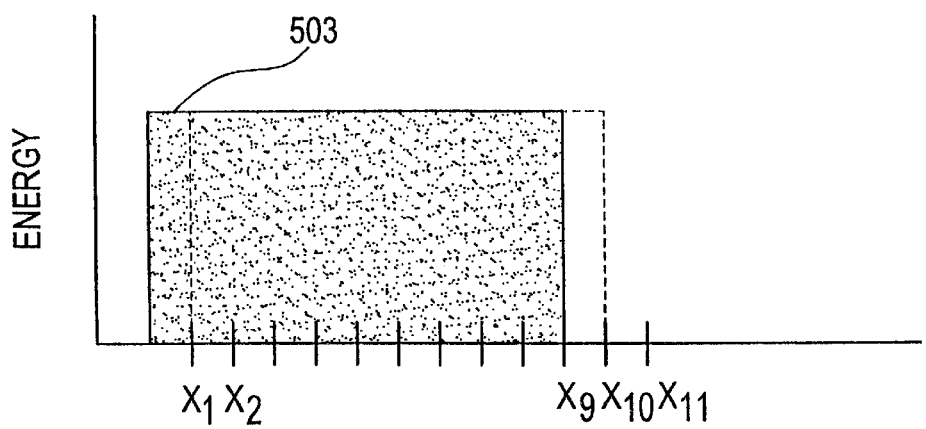

That is, the present invention uses, as shown in FIG. 4A, a laser beam having such a shape that one edge $X_{10}$ of an energy distribution 401 in the width direction at an irradiated surface is nearly vertical, more preferably, as shown in FIG. 5A, a laser beam having such a shape that both edges $X_1$ and $X_{10}$ of an energy distribution 501 in the width direction at an irradiated surface are nearly vertical.

In the present specification, when the blurred region of the energy distribution is less than 100 $\mu$m, the edge is regarded as a nearly vertical shape. It is preferable that the blurred region is not more than 50 $\mu$m.

Figure 4B:
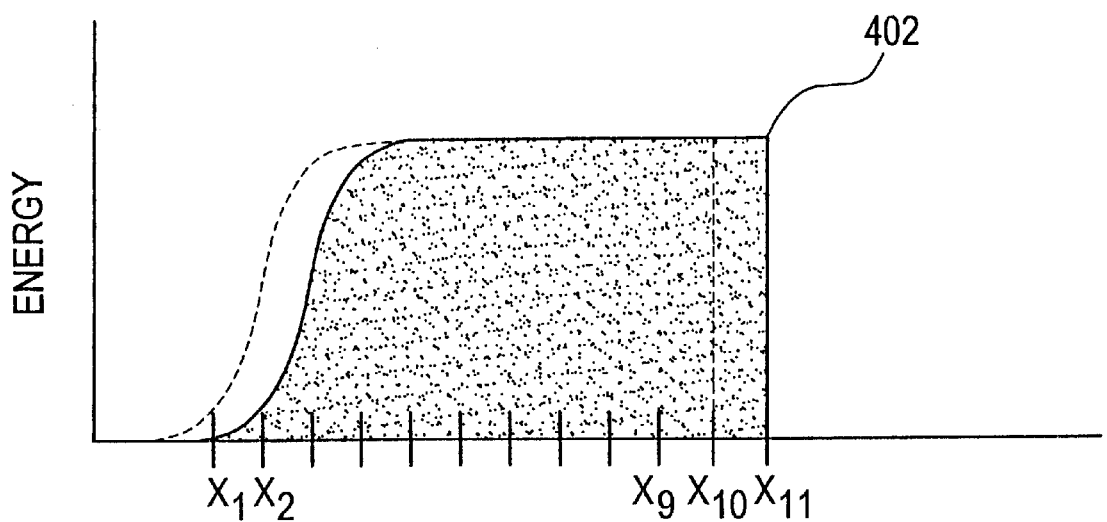

In the case where the linear laser beam having the energy distribution shown in FIG. 4A is used, as indicated by 402 in FIG. 4B, scanning of a next laser beam is made toward the right side on the paper surface with respect to the previous laser irradiation without fail. In this case, when a laser irradiation apparatus of such a structure that the irradiated surface is moved, is used, the irradiated surface is moved toward the left on the paper surface.

On the other hand, in the case where the linear laser beam having the energy distribution shown in FIG. 5A is used, since edges at both sides have nearly vertical shapes, scanning of a next laser beam may be made in any of the right and left directions on the paper surface. For example, a next laser beam is applied to a position denoted by 502 in FIG. 5B or 503 in FIG. 5C.

When the laser beam of the energy distribution shown in FIG. 5 is used, since the whole surface of a film is always irradiated with the uniform and suitable energy laser beam, excellent and uniform laser annealing can be carried out.

Besides, as shown in FIGS. 4A and 4B, by carrying out scanning of the laser beam having one edge ($X_{10}$ side of FIG. 4A) of a nearly vertical shape and the other edge ($X_1$ to $X_2$ in FIG. 4A) of an uneven energy distribution toward the direction of the edge of the nearly vertical shape (right direction on the paper surface), in the portions $X_9$ to $X_{10}$ of FIG. 4, the laser beam of the uniform suitable energy is first radiated as shown in FIG. 4A.

Then, in the next laser beam irradiation shown in FIG. 4B, the uniform laser beam with the suitable energy is applied. When scanning of the laser beam irradiation is made like this, the portions $X_9$ to $X_{10}$ are sequentially irradiated with the laser beam of the uniform suitable energy 7 to 8 times, so that excellent and uniform laser annealing is carried out.

Here, when scanning is continued, the portions $X_9$ to $X_{10}$ of FIG. 4 are also irradiated with the laser beam of the uneven energy distribution (portions indicated by $X_1$ to $X_2$ of FIG. 4A). However, since the energy of the uneven energy distribution is smaller than the suitable energy, the excellent and uniform laser annealing by the first 7 to 8 times of the laser beam irradiation of the uniform suitable energy can be held.

That is, when scanning of the laser beam is carried out in such a state that the edge of the nearly vertical shape in the energy distribution is made the front of the scanning, the excellent and uniform laser annealing can be made over the whole surface of the film.

In FIG. 4A, there exist regions (regions of $X_1$ to $X_2$) where the energy distribution is uneven in the first laser beam. When scanning of the linear laser beam is made, since the scanning is made from one of the end portions of a substrate to the other end portion, this uneven portion is formed on only one of the end portions of the substrate first irradiated with the laser beam. The end portion of the substrate is not generally used for a semiconductor element, there does not particularly occur a problem.

In the conventional laser beam, the reason why the edges of the energy distribution in the width direction become uneven, is aberration of the cylindrical lens group 203 and the cylindrical lenses 204 and 208 of FIG. 2, especially spherical aberration.

Figure 6:
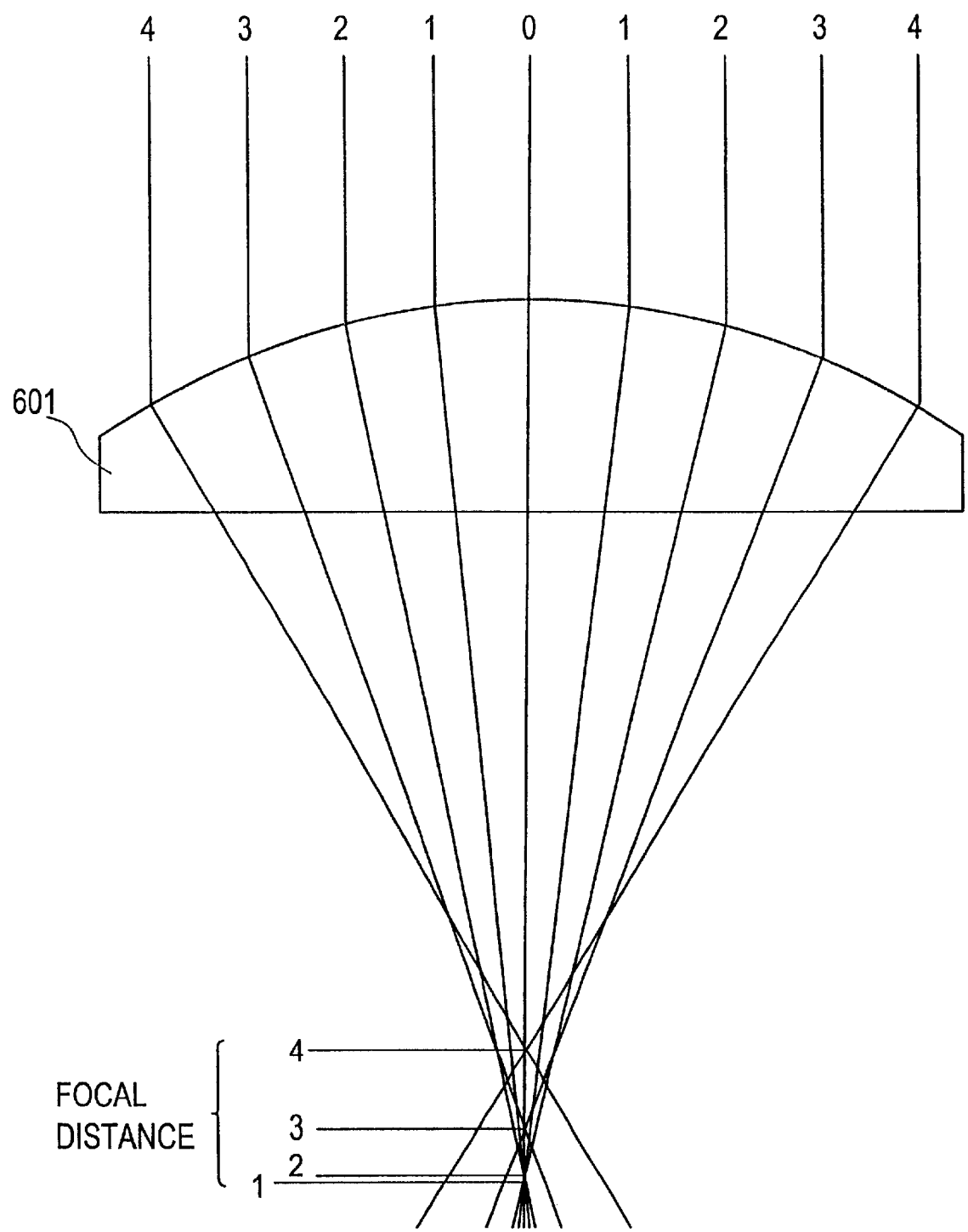
FIG. 6 is an explanatory view of spherical aberration.

By the spherical aberration, the focal distance of a light beam making transmission/imaging becomes different according to the height of incident pupil of the lens. FIG. 6 is a schematic view for explaining the spherical aberration. FIG. 6 shows errors in the focal distance when parallel laser beams with different incident pupils of 0 to 4 are incident on a lens 601 from the above on the paper surface.

As shown in FIG. 6, at the end side of a lens curved surface that is, in the laser beam with large number, an error in the focal distance becomes large and the beam receives large aberration. In the laser beam with small number near the center, the error is small and the beam hardly receives aberration.

With respect to the cylindrical lens, since the shape of its section is the same as the shape shown in FIG. 6, similar spherical aberration occurs.

Figure 7:
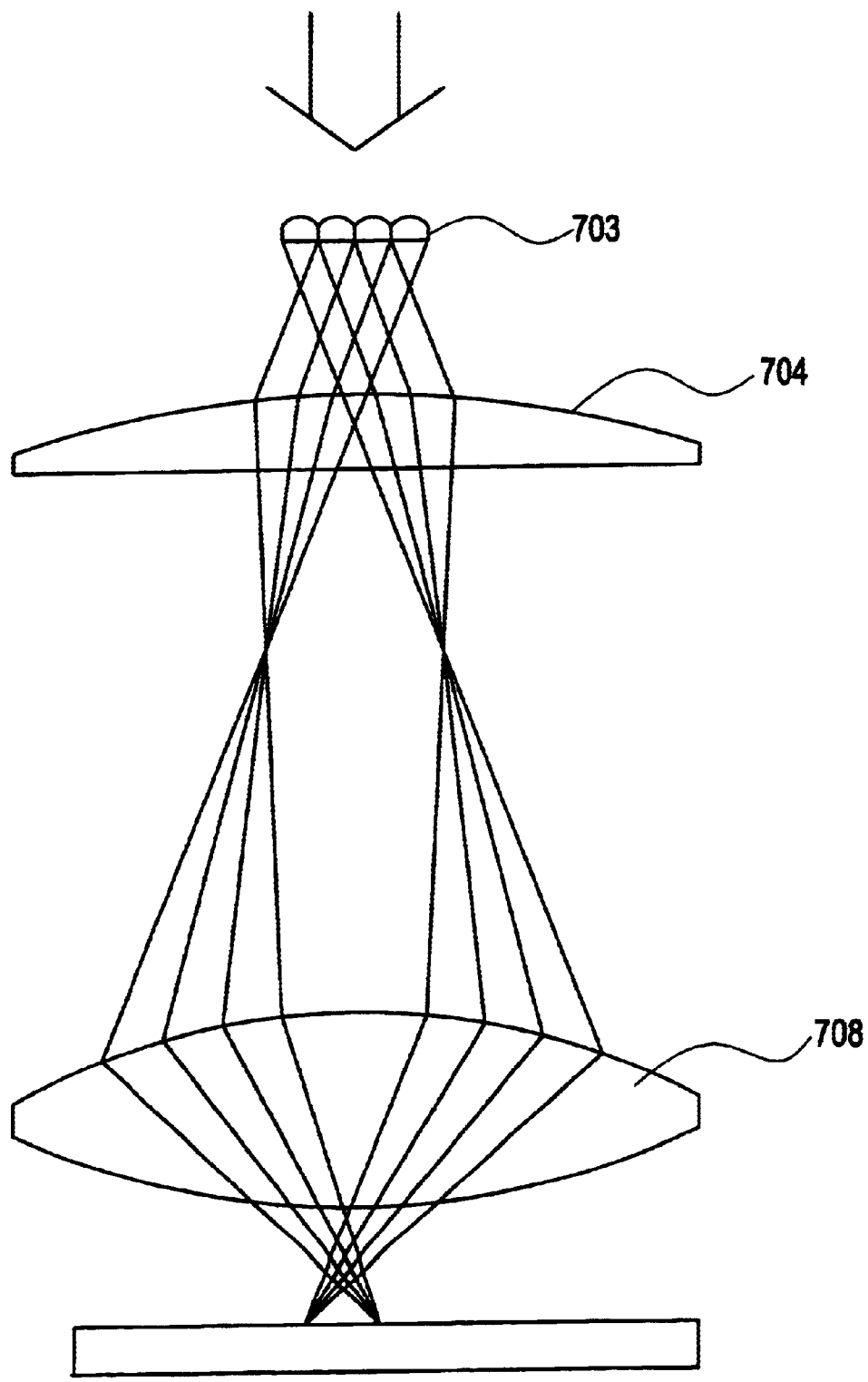
FIG. 7 is a view showing a conventional optical system and optical path for processing a linear laser beam in a width direction.

FIG. 7 is a schematic view showing only a beam homogenizer relative to the width direction of a linear laser beam. Here, a cylindrical lens group 703 has a function to divide the laser beam in the width direction, and cylindrical lenses 704 and 708 have a function to overlap and homogenize the divided laser beams.

Thus, the incident laser beam first receives spherical aberration by the cylindrical lens group 703, and further receives aberration by the cylindrical lens 704 and aberration by the cylindrical lens 708.

In order to process the laser beam into the energy distribution shown in FIG. 5, ideally, it is satisfactory if the aberration of the cylindrical lens group 703, the cylindrical lens 704, and the cylindrical lens 708 is eliminated.

As means for reducing the aberration, there are two methods described below.
1. To use combination lenses made of a plurality of lenses.
2. To use an aspheric lens.

Figure 8A:
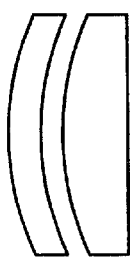
FIGS. 8A to 8E are views showing examples of combination lenses composed of a plurality of lenses.
Figure 8B:
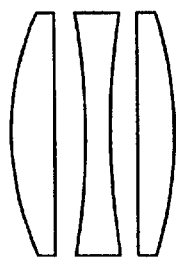
Figure 8C:
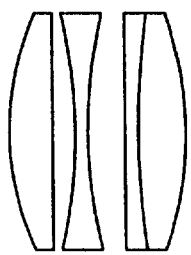
Figure 8D:
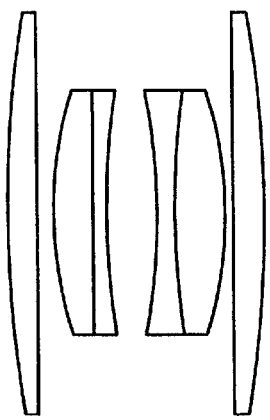

FIGS. 8A to 8E show examples of the combination lenses. FIG. 8A shows a lens in which a convex meniscus cylindrical lens and a planoconvex cylindrical lens are combined. FIGS. 8B to 8D show combination lenses especially referred to as symmetrical lenses, which can further reduce the aberration.

FIG. 8B is a triplet type symmetrical lens made of a structure of convex, concave, and convex lenses. FIG. 8C shows a Tessar type symmetrical lens in which a rear group of the triplet type lens is made a cemented lens. FIG. 8D shows a Gaussian type symmetrical lens, which can reduce the aberration most effectively among the lenses of FIGS. 8A to 8D.

Although FIGS. 8A to 8D show sections of the cylindrical lenses, in order to apply to a cylindrical lens group, it is satisfactory if each cylindrical lens of the cylindrical lens group may be made up of combination lenses.

Figure 8E:
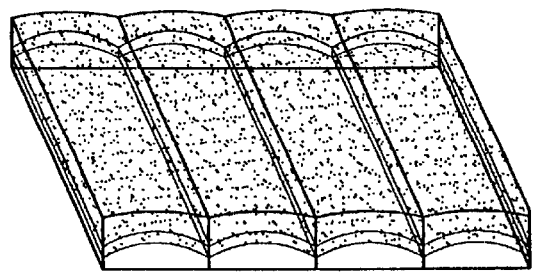

FIG. 8E shows an example of a combination cylindrical lens group in which combination lenses of the convex meniscus cylindrical lenses shown in FIG. 8A and the planoconvex cylindrical lens is used for each cylindrical lens.

Only if the combination lenses or at least one aspheric lens is used for one of the lenses, unevenness of an edge can be improved as compared with the conventional energy distribution. Particularly, since the cylindrical lens 708 has a short focal distance to an incident pupil, the aberration is large, and when the combination lenses or at least one aspheric lens is used, remarkable effects in improvement of unevenness can be obtained.

Of course, when all lenses are made up of the combination lenses or aspheric lenses, the edge further approaches a vertical shape.

However, when the combination lenses is used for the cylindrical lens group 703, the cylindrical lens group 703 is very small, and in a laser irradiation apparatus of an excimer laser, the lens width of each cylindrical lens is generally about several mm. Thus, since a lens to be combined also becomes small, it is very difficult to polish the combined lens with high accuracy, and the cost becomes as high as a factor of several times.

When the aspheric lens is used for the cylindrical lens group 703, as described above, since the cylindrical lens group 703 is very small, processing is difficult, and it is very difficult to polish all cylindrical lenses with high accuracy.

Further, in the case where a high output excimer laser is used, since the energy of the laser beam is high, it is necessary to use a material (for example, quartz, etc.) with a high melting point for the lens. It is further difficult to uniformly process each cylindrical lens of quartz of high hardness with high accuracy, and the cost becomes higher, so that it is not suitable for industrial application.

Figure 9:
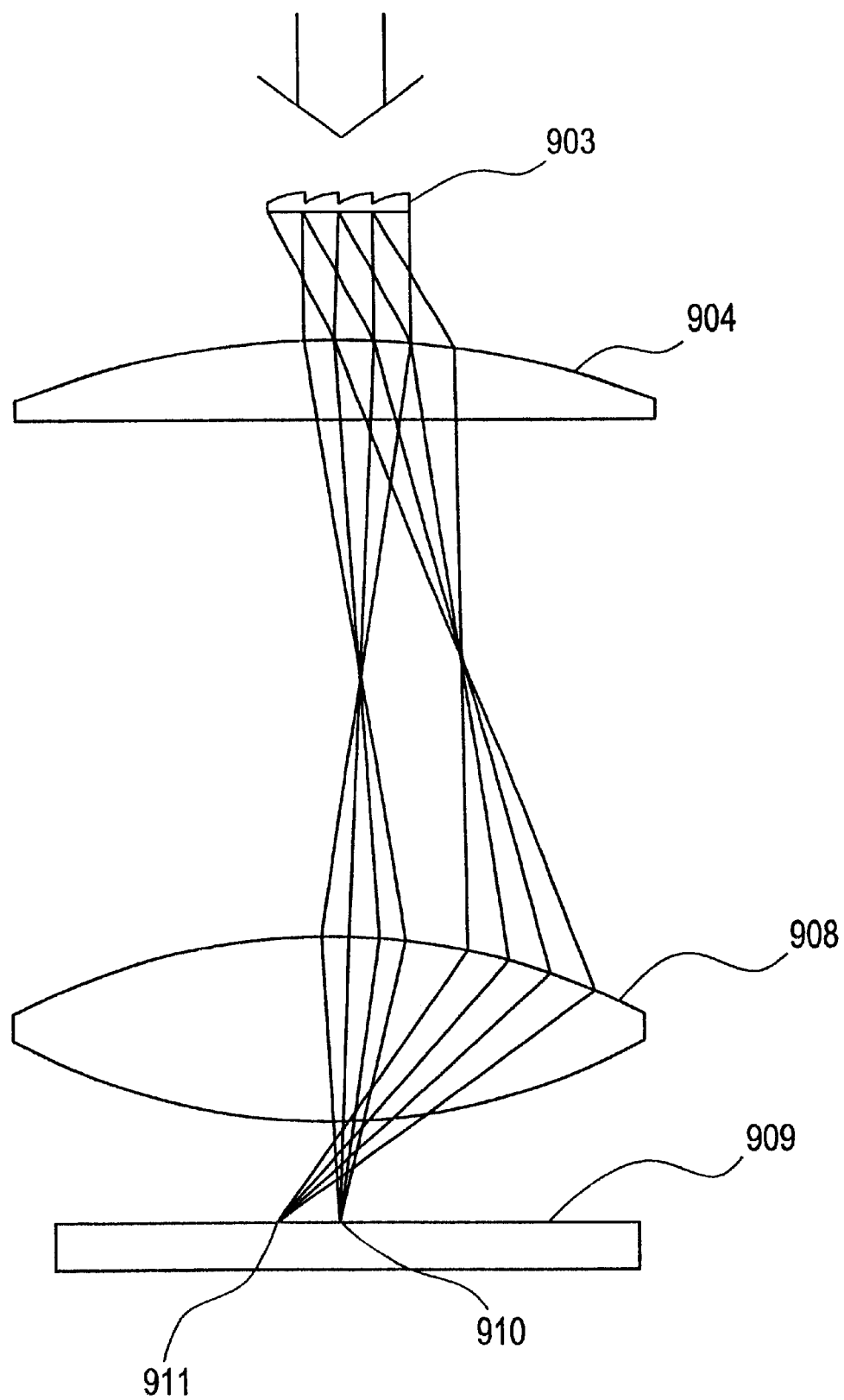
FIG. 9 is a view showing an optical system and optical path of the present invention for processing a linear laser beam in a width direction.

As a method of forming the laser beam of the energy distribution shown in FIG. 4, FIG. 9 shows an optical system therefor. FIG. 9 is a schematic view showing only a beam homogenizer relative to the width direction of the linear laser beam.

Here, terms used in the present specification will be defined as follows: In a cylindrical lens, a light path through which incident light can transmit without being refracted will be referred to as a basic line, and a plane including all the basic lines will be referred to as a basic plane.

In FIG. 9, an optical lens 903 serving to divide the laser beam in the width direction is made of lenses (referred to as semicylindrical lenses) where each cylindrical lens of a cylindrical lens group is cut along the basic plane. The optical lens has a structure that several semicylindrical lenses are arranged in the same direction. This structure will be referred to as a semicylindrical lens group.

When the optical lens 903 is made to have such a structure, the laser beams applied to an edge 910 of a substrate 909 through light paths indicated by thick lines in FIG. 9 pass through the basic line in the optical lens 903, so that they hardly receive aberration of the optical lens 903.

Thus, at the edge 910 of the energy distribution on the irradiated surface of the substrate 909, it is possible to obtain the laser beam in which its blurred region is about 25 μm, that is, the edge has a nearly vertical shape.

The energy distribution of the other edge 911 of FIG. 9 becomes an uneven edge since laser beams receive large aberration at the optical lens 903.

Figure 10A:
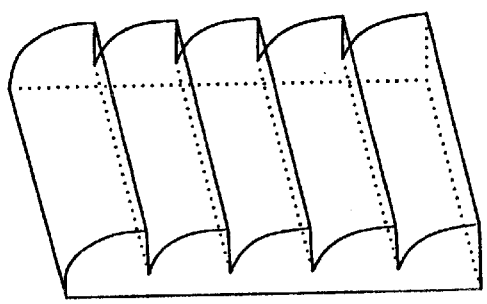
FIGS. 10A to 10E are views showing examples of semi-cylindrical lens groups.
Figure 10B:
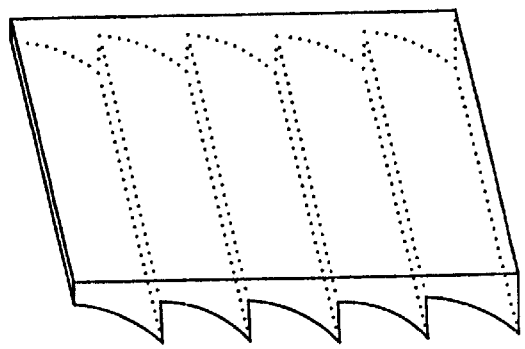

FIGS. 10A to 10E show examples of the optical lens 903. FIG. 10A shows a lens made of semicylindrical lenses in each of which a planoconvex cylindrical lens is cut along the basic plane. FIG. 10B shows a lens made of semicylindrical lenses in each of which a planoconcave cylindrical lens is cut along the basic plane.

Figure 10C:
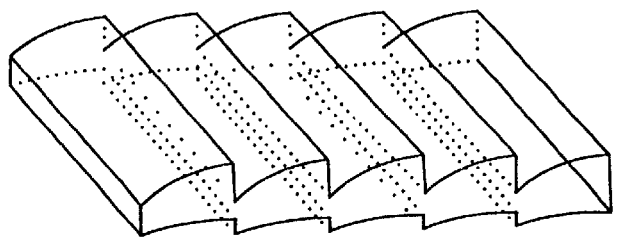
Figure 10D:
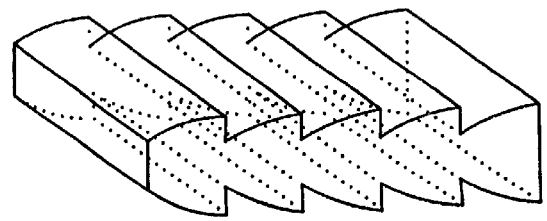
Figure 10E:
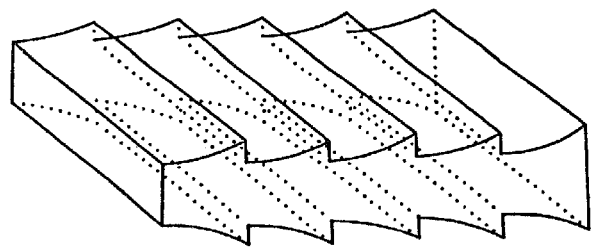

FIG. 10C shows a structure in which semicylindrical lenses each obtained by cutting a convex meniscus cylindrical lens along the basic line are arranged in the same direction. FIG. 10D uses semicylindrical lenses of both convex cylindrical lenses, and FIG. 10E uses semicylindrical lenses of both concave cylindrical lenses.

Although each of the semicylindrical lens groups shown in FIGS. 10A to 10E is made of five semicylindrical lenses, it is sufficient if the number of semicylindrical lenses is at least two. Although the number of optimum lenses is different according to the size of each semicylindrical lens and the size of incident laser beam, if the number of semicylindrical lenses is four or more, the laser beam is divided and the energy distribution becomes sufficiently uniform.

As the most preferable structure, when aberration is reduced by using combination lenses or at least one aspheric lens for the optical systems 904 and 908 for overlapping and homogenizing the laser beams divided by the optical lens 903, it is possible to obtain a laser beam in which the blurred region at the edge 910 is 25 μm or less and the edge has a further nearly vertical shape.

However, in view of problems of the size of the apparatus, cost and the like, even in the structure in which aberration is reduced by using the combination lenses or at least one aspheric lens for only the optical system 908 having a short focal distance to the incident pupil, a sufficient effect is obtained and the structure is preferable.

Figure 11:
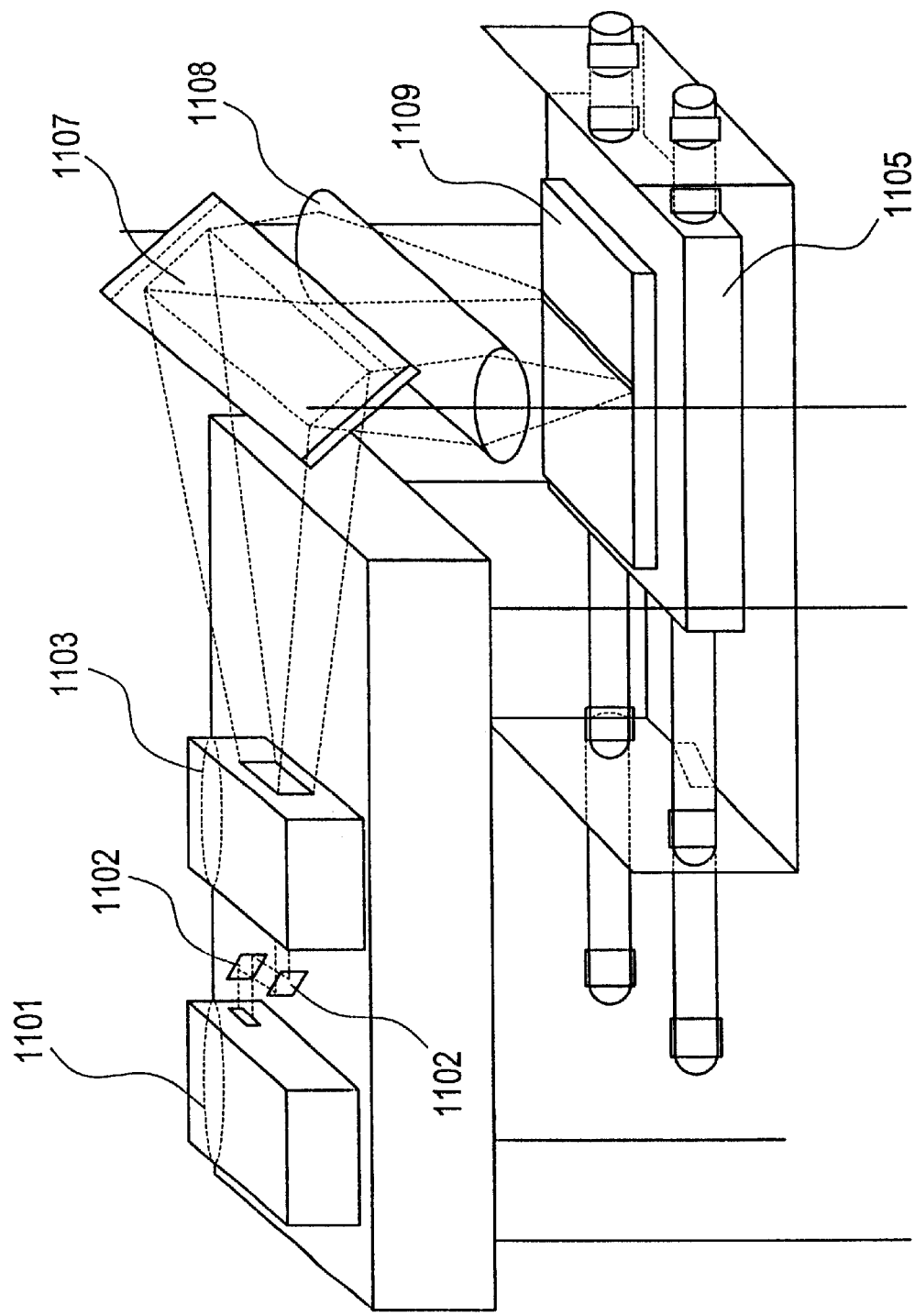
FIG. 11 is a schematic view showing a laser annealing apparatus of an embodiment of the invention.

FIG. 11 shows a linear laser irradiation apparatus using an optical system in which aberration is reduced, as a beam homogenizer in a width direction. In FIG. 11, a laser beam radiated from a laser beam generating unit 1101 is processed into a linear shape through optical systems 1103 and 1108. A reflecting mirror 1107 reflects the direction of the laser beam toward a processed substrate 1109. Although the reflecting mirror 1107 is not always necessary, it is provided to make the laser irradiation apparatus compact.

An irradiation stage 1105 holding the processed substrate 1109 can be moved relative to the width direction of the linear laser beam. In the laser irradiation apparatus shown in FIG. 11, such a structure is adopted that the irradiation stage is moved. However, such a structure may be adopted that the linear laser beam is moved.

However, when the linear laser beam is moved, the energy distribution is apt to change, so that there is a fear that the laser annealing becomes uneven. Thus, it is preferable that the irradiation stage is moved.

In the case where the linear laser beam in which only one of the edges is vertical is used, the scanning direction of the linear laser beam is, as shown in FIG. 4B, limited to only the direction in which the vertical edge is made the front of the scanning.

The optical system 1103 includes an optical system processing the laser beam in the linear direction, and an optical system dividing the laser beam in the width direction. The optical system 1108 serves to overlap the laser beams divided in the width direction on the same plane.

Since the direction of the laser beam emitted from a laser generating unit 1101 is changed subtly each time when the laser irradiation apparatus is adjusted, it has been difficult to make the laser beam straightly incident on the optical system 1103, that is, as the light beam parallel to the basic plane.

Thus, a reflecting mirror 1102 of FIG. 11 is arranged at an emitting port of the laser generating unit and an angle of the reflecting mirror 1102 is adjusted, so that the direction of the laser beam is finely adjusted. As a result, the laser beam can be made straightly incident on the optical system 1103.

Although it is possible to adjust the emitting direction of the laser beam not by providing the reflecting mirror 1102 but by finely adjusting the oscillation mirror of the laser generating unit 1101, this operation is troublesome and is not practical.

In the above, the beam homogenizer for processing the laser beam into the beam having the energy distribution in which at least one edge is vertical, and the laser irradiation apparatus using the beam homogenizer have been explained.

Moreover, the foregoing beam homogenizer can also be applied to not only the case of processing the laser beam into a linear shape, but also the case of processing the laser beam into a rectangular or square shape with an aspect ratio of 100 or less. When the laser beam is processed into the rectangular or square shape, not the linear shape, the foregoing beam homogenizer is used for both the vertical direction and the horizontal direction, so that it is also possible to obtain the laser beam with the energy distribution where at least adjacent two side edges have nearly vertical shapes.

In the case where the irradiated surface is scanned with the rectangular or square laser beam, similarly to the scanning method of the linear laser beam, it is appropriate that the scanning is made with the vertical edge as the front of the scanning.

In this case, if the length of the rectangular or square laser beam in the long side direction is longer than the length of the short side of the substrate, similarly to the linear laser beam, laser annealing is completed by scanning in only one direction.

However, in the case where the length of the rectangular or square laser beam in the long side direction is shorter than the length of the short side of the substrate, it is necessary to make scanning of the rectangular or square laser beam in two directions. Thus, in order to uniformly make the laser annealing, it is necessary to use the laser beam having the energy distribution in which at least two adjacent side edges are vertical.

The scanning width of a conventional laser beam is $1/10$ to $1/20$ of the width of the laser beam in order to make a stripe inconspicuous. On the other hand, when the laser beam having the edge of a nearly vertical shape according to the present invention is used, the scanning width can be enlarged.

That is, in the case where the laser beam having the energy distribution shown in FIG. 4A is used, the scanning width can be made large to the degree that the uneven edge overlaps the former laser beam. However, when the scanning width is made $1/5$ or more, the laser beams are shot to one irradiated surface several times, and the process moves to the next laser beam irradiation position.

On the other hand, in the case where the laser beam having the energy distribution shown in FIG. 5A is used, the scanning width can be ideally enlarged to the width of the laser beam. In this case, the laser beams are shot to one irradiated surface 5 to 20 times, and the process moves to the next laser beam irradiation position.

Thus, it becomes possible to greatly improve the throughput of the laser annealing step. Particularly, when the rectangular or square laser beam with a small aspect ratio is used, remarkable effects can be obtained.

In the following embodiments, laser annealing using the foregoing laser irradiation apparatus will be described with reference to specific examples.

Incidentally, although the description will be made on laser annealing of a silicon film in the embodiments, the laser annealing of the present invention is not limited to the silicon film.

Embodiment 1

First, a method of manufacturing a film to be irradiated with laser will be described. The films to be irradiated with laser are three kinds of films in the present specification. The present invention is effective for any film.

In any film, first, a Corning 1737 glass substrate of 127 mm square is used as a substrate, a silicon oxide film with a thickness of 200 nm is formed as an under film on the substrate, and an amorphous silicon film with a thickness of 50 nm is formed thereon by a plasma CVD method. This film will be hereinafter referred to as a starting film.

Manufacturing Procedure of Film A

The starting film is subjected to heat bathing at 450° C. for one hour. This step is for reducing the hydrogen concentration in the amorphous silicon film. If the concentration of hydrogen in the film is excessively high, the film can not resist the laser energy, so that this step is required.

The density of hydrogen in the film is suitably the order of $10^{20}$ atoms/cm$^3$. This film will be referred to as a non-single crystal silicon film A.

Manufacturing Procedure of Film B

A nickel acetate solution of 10 ppm is applied to the starting film by a spin coating method to form a nickel acetate layer. It is more preferable to add a surfactant to the nickel acetate solution. Since the nickel acetate layer is very thin, although it is not always film-like, a problem does not occur in the subsequent steps.

Next, the substrate on which each film is laminated in the manner described above is subjected to thermal annealing at 600° C. for 4 hours. Then, the amorphous silicon film is crystallized, so that a crystalline silicon film B of a non-single crystal silicon film is formed.

At this time, nickel as a catalytic element functions as nuclei of crystal growth, so that crystallization is accelerated. By the function of nickel, crystallization can be made at a low temperature for a short time such as 600° C. and 4 hours. The details are disclosed in Japanese Patent Unexamined Publication No. Hei. 6-244104.

It is preferable that the concentration of the catalytic element is $1\times10^{15}$ to $1\times10^{19}$ atoms/cm$^3$. When the concentration is as high as $1\times10^{19}$ atoms/cm$^3$ or more, metallic properties appear in the crystalline silicon film, and the semiconductor characteristics are lost. In the present embodiment, the concentration of the catalytic element in the crystalline silicon film is $1\times10^{17}$ to $5\times10^{18}$ atoms/cm$^3$ as the minimum value in the film. These values are obtained by analysis and measurement with secondary ion mass spectroscopy (SIMS).

Manufacturing Procedure of Film C

A silicon oxide film with a thickness of 700 Å is further formed on the starting film. A plasma CVD method is used as a film formation method.

Next, a part of the silicon oxide film is completely opened by a photolithographic patterning step.

Further, for the purpose of forming a thin oxide film on the opening portion, irradiation of UV light is carried out in an oxygen atmosphere for 5 minutes. This thin oxide film is formed to improve wettability of the opening portion to a subsequently introduced nickel solution.

Next, a nickel acetate solution of 100 ppm is applied to the film by a spin coating method, so that nickel acetate enters the opening portion. It is more preferable to add a surfactant into the nickel acetate solution.

Next, thermal annealing at 600° C. for 8 hours is carried out, so that crystal grows from the nickel introduced portion in the lateral direction. At this time, the role of nickel is the same as in the film B. In the condition at this time, about 40 μm as a lateral growth amount is obtained.

In this way, the amorphous silicon film is crystallized, so that a crystalline silicon film C of a non-single crystal silicon film is formed. Thereafter, the silicon oxide film on the crystalline silicon film is removed by using buffered hydrofluoric acid.

Laser annealing using an excimer laser is applied to the non-single crystal silicon films A, B, and C obtained in this way.

FIG. 11 shows a laser irradiation apparatus in the present embodiment. FIG. 11 shows the outline of the laser irradiation apparatus.

In FIG. 11, a laser beam is radiated from a laser beam generating unit 1101, and after the travelling direction of the laser beam is adjusted by reflecting mirrors 1102, the beam is processed by optical systems 1103 and 1108 so that its sectional shape is made linear. A reflecting mirror 1107 reflects the pulse laser beam, so that a processed substrate 1109 is irradiated with the laser beam. A beam expander which suppresses an expanding angle of the laser beam and can adjust the size of the beam may be inserted between the reflecting mirrors 1102.

An irradiation stage 1105 holding the processed substrate 1109 can be moved in the width direction of the linear laser beam.

Figure 12:
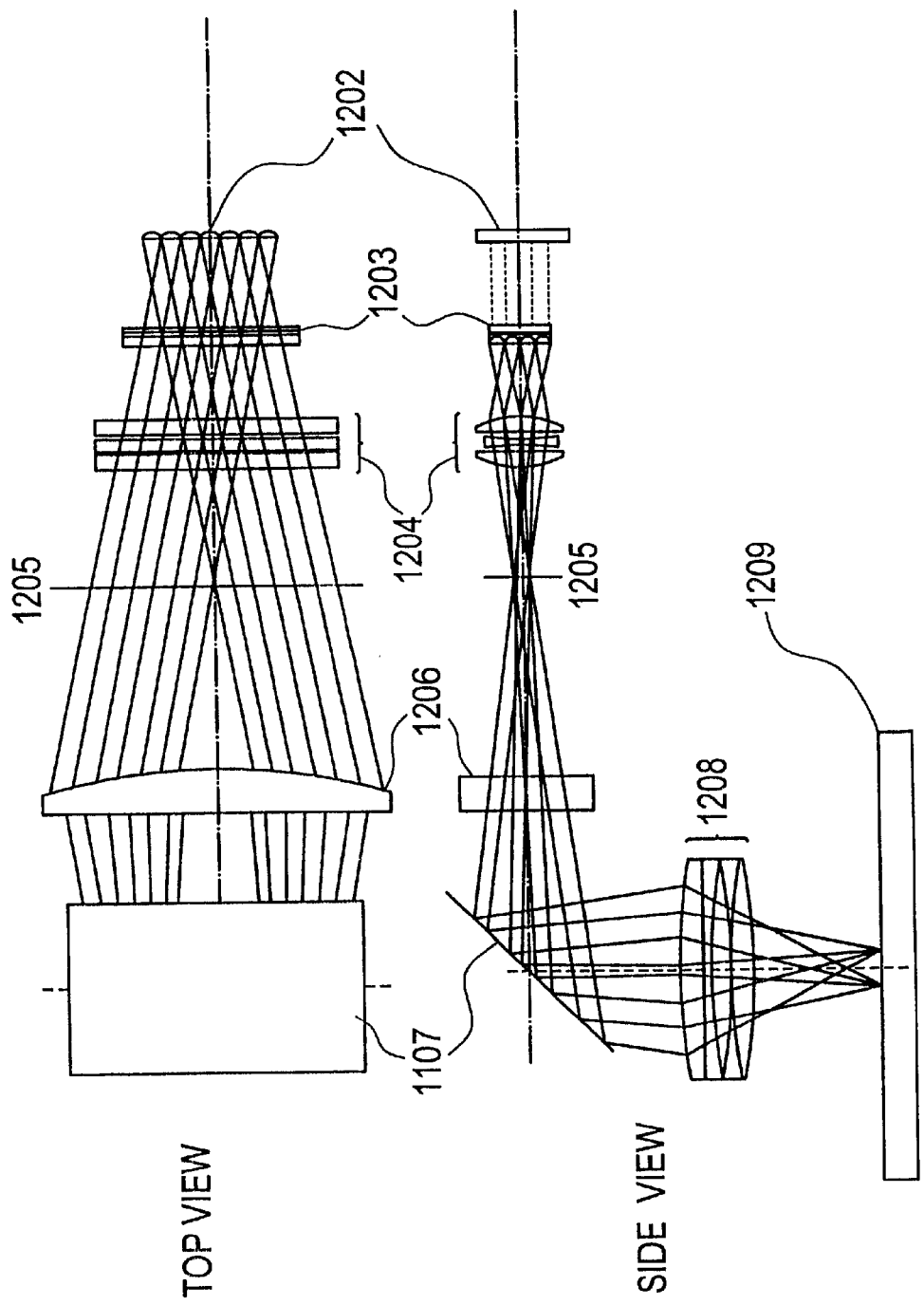
FIG. 12 is a view showing an optical system and optical path of the present invention for forming a linear laser beam.

The optical system 1103, the reflecting mirror 1107, and the cylindrical lens 1108 according to the present embodiment have structures shown in FIG. 12.

In FIG. 12, the incident laser beam is divided in the linear direction by a cylindrical lens group 1202, and is divided in the width direction by a combination cylindrical lens group 1203 shown in FIG. 8E.

In the present embodiment, although the structure shown in FIG. 8E is used as the optical lens for dividing the laser beam in the width direction, such a structure may be adopted that FIGS. 8B to 8D are combined to form a cylindrical lens group, or a cylindrical lens group in which almost all aberration is eliminated by processing lenses into aspheric lenses may be used.

Then the laser beams divided by an optical lens 1204 made of a triplet type symmetrical lens are overlapped and homogenized, and the laser beams are overlapped on the processed substrate 1209 relative to the width direction through a slit 1205 and a cylindrical lens 1206 and by an optical lens 1208 made of a Tessar type symmetrical lens.

In the present embodiment, although the symmetrical lens is used as the optical lenses 1204 and 1208, another combination lenses may be used, or such a structure that aberration is almost eliminated by making an aspheric lens may be adopted.

The slit 1205 is not always required, and is used when the width of the linear laser beam is thinly adjusted.

By using such apparatuses, processing of the laser beam as described below was carried out.

As the laser beam generating unit 1101, the unit for oscillating XeCl excimer laser (wavelength 308 nm) is used. Other than this, KrF excimer laser (wavelength 248 nm), ArF (wavelength 193 nm), KrCl (wavelength 222 nm), and the like may be used.

The length of the laser beam in the width direction emitted from the laser generating unit is about 16 mm. The laser beam is made incident on the optical lens for dividing the laser beam in the width direction.

The optical lens 1203 uses such a structure that a cylindrical lens group in which seven cylindrical lenses each made of synthesis quartz with a width of 2 mm are arranged in parallel to each other is combined with a cylindrical lens group in which seven cylindrical lenses each made of synthetic quartz with a width of 2 mm and having convex and convex surfaces are arranged in parallel to each other. In FIG. 12, although only four optical lenses are shown, this is for simplifying the drawing.

As described above, the optical lens 1203 has a width of 14 mm smaller than a width of 16 mm of the incident laser beam, and the end portion of the incident laser beam is not used.

Since the end portion of the incident laser beam has uneven energy, it is preferable not to use the end portion so as to raise uniformity.

The laser beams divided in the width direction in this way pass through the optical lens 1204 and the optical lens 1208, and are processed into a width of 300 to 1000 μm on the substrate. The width of the laser beam can be changed by adjusting the distance between the optical lenses 1204 and 1208.

Since the linear laser beam processed in this way does not receive lens aberration relative to the width direction, it becomes the laser beam as shown in FIG. 5A in which the edges of the energy distribution are vertical.

Figure 13:
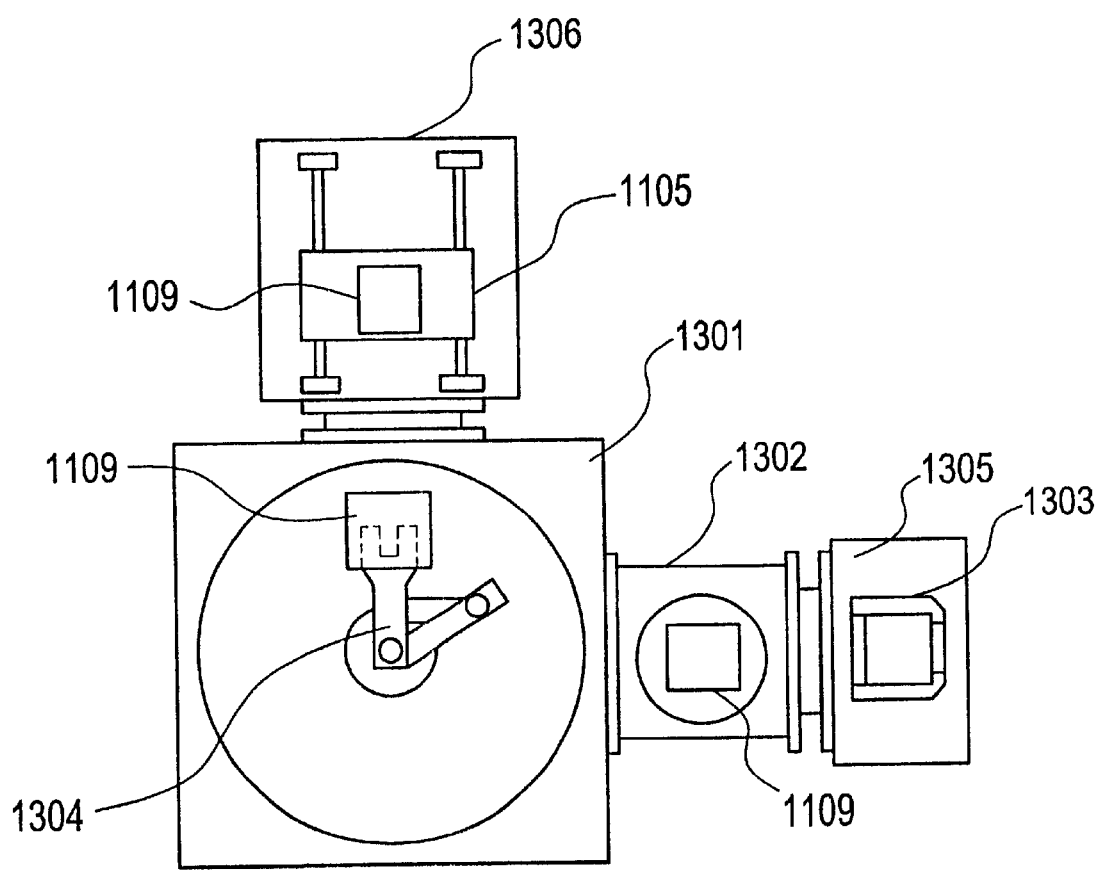
FIG. 13 is a view showing a laser irradiation system of the present invention.

Next, an apparatus shown in FIG. 13 will be described. A cassette 1303 in which a number of, for example, 20 processed substrates 1109 are contained is disposed in a load/unload chamber 1305. One substrate is transferred from the cassette 1303 by a robot arm 1304 into an alignment chamber 1302.

In the alignment chamber 1302, an alignment mechanism for correcting the positional relation between the processed substrate 1109 and the robot arm 1304 is disposed. The alignment chamber 1302 is connected to the load/unload chamber 1305.

The substrate is transferred into a substrate transfer chamber 1301 by the robot arm 1304, and further, transferred into a laser irradiation chamber 1306 by the robot arm 1304.

In FIG. 11, the linear laser beam radiated to the processed substrate 1109 has 0.4 mm in width×135 mm in length.

The energy density of the laser beam at the irradiated surface is in the range of 100 mJ/cm$^2$ to 500 mJ/cm$^2$, for example, 350 mJ/cm$^2$. The irradiation stage 1105 is moved in one direction at 1.2 mm/s so that the linear laser beam is made to scan.

The oscillation frequency of the laser is 30 Hz, and when an attention is paid to one point of the irradiated object, 10 shots of the laser beams are applied. The number of shots is suitably selected in the range from 5 shots to 50 shots.

After the end of the laser irradiation, the processed substrate 1109 is returned to the substrate transfer chamber 1301 by the robot arm 1304.

The processed substrate 1109 is transferred to the load/unload chamber 1305 by the robot arm 1304 and is stored in the cassette 1303.

With this, the laser annealing step is ended. In this way, the foregoing step is repeated, so that a number of substrates can be continuously processed one by one.

In the present embodiment, although the linear laser is used, even if any beam shape from the linear shape to the square is used, the effect of the feature of the present invention is obtained.

As the result that the non-single crystal films A, B, and C were subjected to laser annealing by using this laser irradiation apparatus, in the non-single crystal silicon film A, it was possible to obtain a uniform laser crystallized polycrystal silicon film over the whole surface of the substrate.

In the non-single crystal silicon films B and C, the crystallinity of the silicon film over the whole surface of the substrate was further promoted, so that it was possible to obtain a polycrystal silicon film having a high mobility.

In the present embodiment, although the symmetrical lenses are used as the optical lenses 1204 and 1208, another combination lenses may be used, or such a structure that aberration is almost eliminated by making an aspheric lens may be adopted.

In the present embodiment, although the combination lenses are used for the optical lenses 1204 and 1208 to reduce aberration, even if only the optical lens 1208 is made the combination lenses, and the optical lens 1204 is made a cylindrical lens single body, it is possible to relieve the stripe formation.

When a TFT having an active layer made of the laser annealed silicon film is manufactured, both of an N channel type and a P channel Type can be manufactured.

The structure of combination of an N channel type and a P channel type can also be obtained. Besides, a number of TFTs can also be integrated to form an electronic circuit.

Although the non-single crystal silicon films A, B, and C are provided on the flat glass substrate, even if the formed surfaces of the non-single crystal silicon films A, B, and C have uneven shapes due to wiring or the like, the laser annealing is effective.

In the case where a liquid crystal display made of TFTs is manufactured by using the semiconductor film subjected to the laser annealing through the optical system of the present invention, a high quality display can be obtained in which fluctuation of characteristics of each TFT is low.

The above can also be applied to a semiconductor film subjected to laser annealing through optical systems indicated in other embodiments.

Embodiment 2

In the present embodiment, the optical system of Embodiment 1 is changed, and laser annealing is carried out by using a laser beam in which one edge of energy distribution has a nearly vertical shape.

Similarly to Embodiment 1, non-single crystal silicon films A, B, and C are prepared, and laser annealing using an excimer laser is carried out.

A laser processing apparatus used in the present embodiment is shown in FIG. 11. In FIG. 11, except an optical system 1103, other structures are the same as in Embodiment 1.

Figure 14:
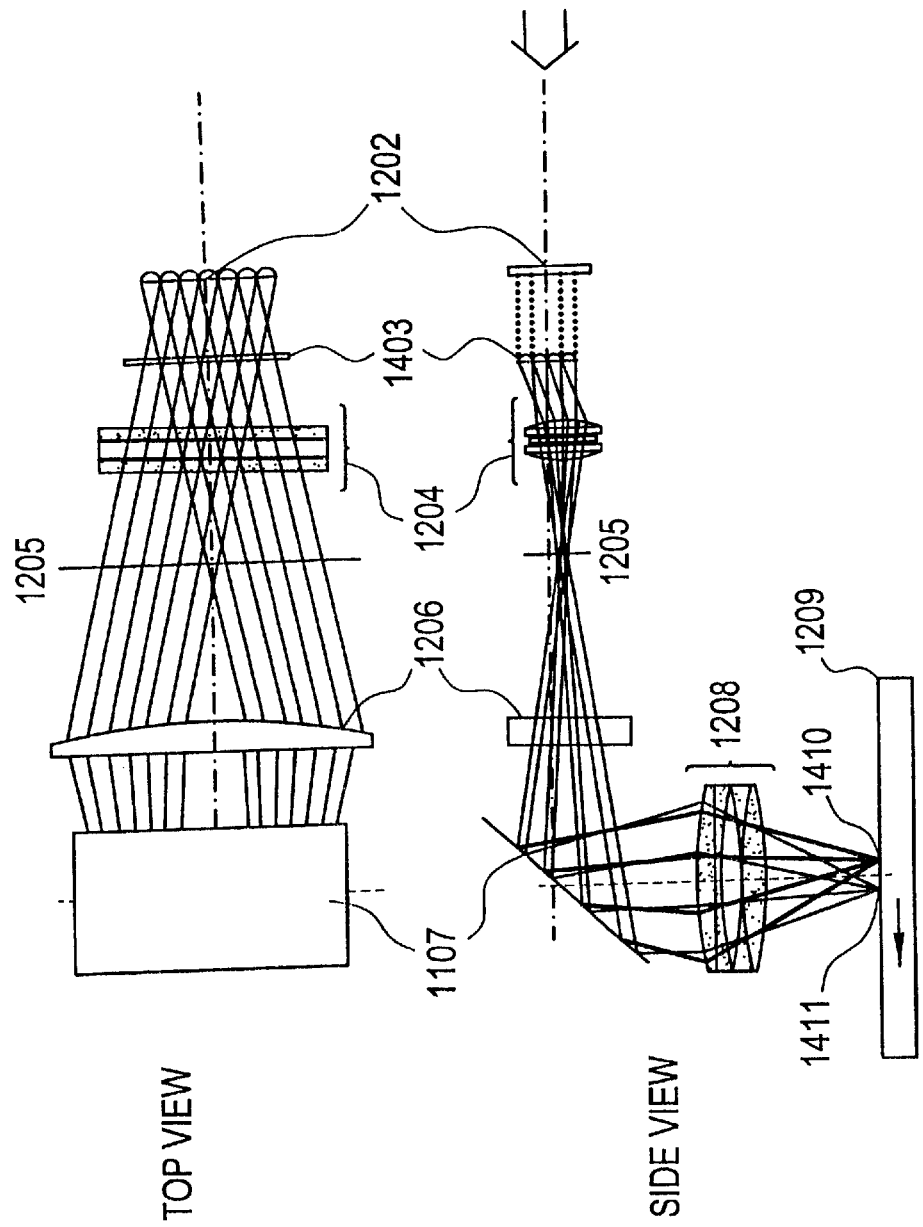
FIG. 14 is a view showing an optical system and optical path of the present invention for forming a linear laser beam.

The optical system 1103, the reflecting mirror 1107, and the cylindrical lens 1108 in the present embodiment have structures shown in FIG. 14.

In FIG. 14, a laser beam is divided in the linear direction by the cylindrical lens group 1202, and is divided in the width direction by the semicylindrical lens group 1403 shown in FIG. 10A.

The semicylindrical lens group 1403 has such a structure that seven semicylindrical lenses each made of synthesis quartz with a is lens width of 2 mm are arranged in parallel to each other. In FIG. 14, although only four semicylindrical lenses are shown, this is for simplifying the drawing.

In the present embodiment, as the optical lens for dividing the laser beam in the width direction, the semicylindrical lens group shown in FIG. 10A is used. However, another structure semicylindrical lens group as shown in FIGS. 10B to 10E may be used.

In the present embodiment, it is more effective that the incident laser beam is made a laser beam parallel to the basic surface of the semicylindrical lens group 1403. Thus, by the reflecting mirrors 1102 of FIG. 11, the direction of the laser beam is finely adjusted.

Then the laser beam is processed into a linear shape by the optical lens 1204 made of the triplet type symmetric lens, the slit 1205, the cylindrical lens 1206, and the optical lens 1208 made of the Tessar type symmetrical lens.

The laser beam processed into the linear shape in this way is applied to the processed substrate 1209. At the laser beam irradiation portion of the processed substrate, the edge 1410 has the energy distribution of a nearly vertical shape since the energy distribution is homogenized through the basic surface of the semicylindrical lens group 1403.

On the other hand, at the edge 1411, since it receives an influence of aberration greatly, an uneven energy distribution is obtained.

Like this, in the case where scanning of the linear laser beam having the energy distribution in which only one edge 1410 has a nearly vertical shape is made, the processed substrate is moved in the direction indicated by an arrow in FIG. 14, and scanning is made with the edge 1410 as the front of the scanning.

Laser annealing of the non-single crystal silicon films A, B, or C is made by using this laser irradiation apparatus. The laser irradiation is carried out under the same laser irradiation condition as in Embodiment 1.

As a result, in the non-single crystal silicon film A, the whole surface of the substrate was almost uniformly laser crystallized to obtain a polycrystal silicon film.

In the non-single crystal silicon films B and C, crystallinity of a silicon film over the whole surface of the substrate was further promoted, and it was possible to obtain a polycrystalline silicon film having a high mobility.

In the present embodiment, although the symmetric lenses are used for the optical lenses 1204 and 1208, another combination lenses may be used, or such a structure that aberration is almost eliminated by making an aspheric lens may be adopted.

Besides, although the combination lenses are used for the optical lenses 1204 and 1208 to reduce aberration, even if only the optical lens 1208 is made the combination lenses, and the optical lens 1204 is made a cylindrical lens single body, the stripe formation can be relieved.

Embodiment 3

In the present embodiment, by using a laser beam processed into a square, the non-single crystal silicon films A, B, and C are subjected to laser annealing.

An optical system for processing a beam into a square is shown in FIG. 15. In the present embodiment, it is preferable that the direction of the incident laser beam is parallel to the basic planes of semicylindrical lens groups 1502 and 1503.

The incident laser beam is divided in an X-axis direction by the semicylindrical lens group 1502, and is divided in a Y-axis direction (the X-axis direction and the Y-axis direction correspond to the linear direction and the width direction in the linear laser beam) by the semicylindrical lens group 1503.

The divided laser beams are overlapped by an optical lens 1506 made of a triplet type symmetric lens with respect to the X-axis direction, and are overlapped with respect to the Y-axis direction by an optical lens 1504 similarly made of a triplet type symmetric lens.

Thus, the laser beam incident on an edge 1510 through an optical path indicated by a thick line in the top view of FIG. 15 hardly receives aberration since it passes through the basic line in the semicylindrical lens group 1502. Similarly, the laser beam incident on the edge 1512 through an optical path indicated by a thick line of the sectional view hardly receives aberration since it passes through the basic line in the semicylindrical lens group 1503.

On the other hand, since the laser beams applied to edges 1511 and 1513 receive large aberration in the semicylindrical lens groups 1502 and 1503, they have uneven energy distribution.

In FIG. 15, although combination lenses are used for the optical lenses 1504 and 1506, an aspheric lens may be used to reduce the aberration. Even if the optical lenses 1504 and 1506 are made cylindrical lens single bodies, it is possible to obtain an energy distribution having edges of nearly vertical shapes as compared with a conventional one.

In a laser processing apparatus used in the present embodiment, an irradiation stage includes means for moving in the two directions of the X-axis direction and the Y-axis direction.

Figure 16A:
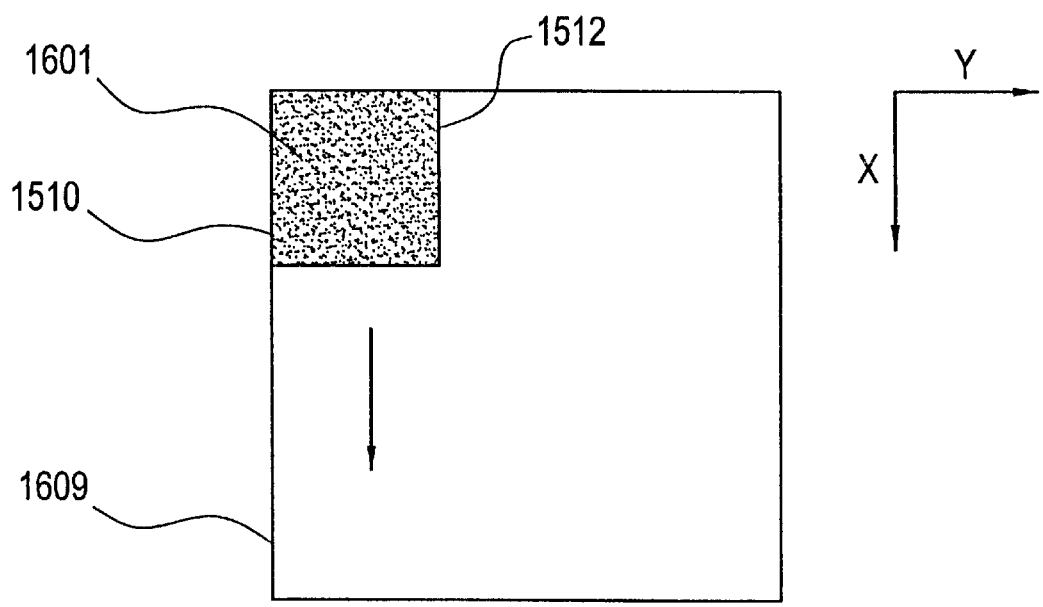
FIGS. 16A and 16B are explanatory views for explaining a method of scanning of the square laser beam of the present invention.
Figure 16B:
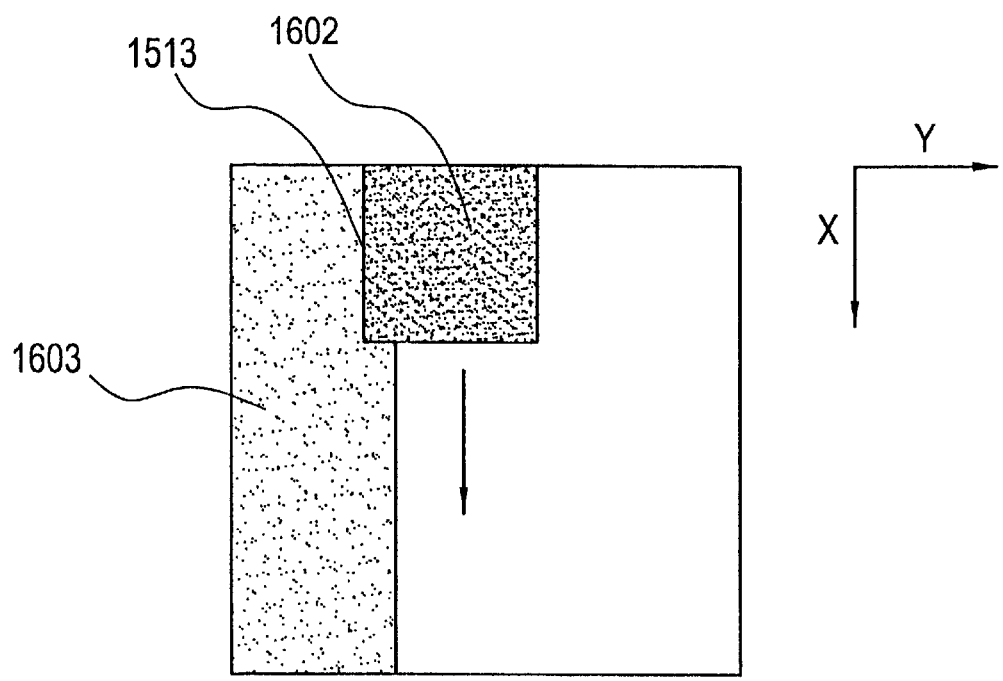

By using the above optical system, the laser beam is processed into a square of 10×10 mm at the processed substrate, and laser annealing is carried out by a scanning method shown in FIGS. 16A and 16B.

In FIG. 16A, the processed substrate 1609 is scanned with the square laser beam from a position indicated by 1601 toward the X-axis direction as indicated by an arrow. Reference numerals 1510 to 1513 in FIG. 16 denote the edges of the laser beam in FIG. 15.

When laser annealing in the X-axis direction indicated by the arrow of FIG. 16A is completed, next laser irradiation is started from a position indicated by 1602 of FIG. 16B where the laser beam moves from the position 1601 in the Y-axis direction with the vertical edge 1512 as the front, and scanning is made in the X-axis direction as shown by the arrow.

By carrying out the scanning in this way, since the scanning is made in the direction where the edge 1510 with the energy distribution of the nearly vertical shape is made the front of the scanning, a region 1603 subjected to the laser annealing is almost uniformly subjected to the laser annealing.

When scanning is made in the X-axis direction from the position 1602, the uneven edge 1513 at the position 1602 overlaps with the region 1603 and scanning of the laser beam is made, so that it is possible to prevent uneven laser annealing by the uneven energy distribution edge 1513.

This laser irradiation apparatus is used to laser anneal the non-single crystal silicon films A, B, and C. Laser irradiation conditions and moving conditions of the irradiation stage were made the same as in Embodiment 1.

The moving conditions of the irradiation stage in the present embodiment are such that 5 to 20 shots of the laser beams, 10 shots in the present embodiment are applied to one irradiated surface. Then the irradiated surface is moved in the X-axis direction by 9 mm, and next laser beam irradiation is carried out.

When laser annealing in the X-axis direction is once ended, the laser beam is moved in the Y-axis direction by 9 mm, and laser annealing in the X-axis direction is repeated. Under this condition, laser annealing is carried out by the scanning method shown in FIGS. 16A and 16B.

In the present embodiment, although the laser beam is moved with an interval of 9 mm, as indicated in Embodiment 1, a method of scanning in the X-axis direction at a speed of 1.2 mm/s may be adopted.

As a result, in the non-single crystal silicon film A, it was possible to obtain a polycrystal silicon film in which the whole surface of the substrate was almost uniformly laser crystallized.

In the non-single crystal silicon films B and C, the crystallinity of the silicon films on the whole surface of the substrate was further promoted, and it was possible to obtain polycrystal silicon films having a high mobility.

Embodiment 4

In the present embodiment, an example in which a TFT is manufactured by using a polycrystal silicon film obtained in Embodiment 1 or Embodiment 2, will be described.

An active layer pattern of a TFT is formed by patterning the foregoing polycrystal silicon film. A channel formation high resistance region is formed in this active layer pattern. After an active layer is formed, a silicon oxide film with a thickness of 100 nm is formed as a gate insulating film by a plasma CVD method.

Next, a titanium film with a thickness of 400 nm is formed by a sputtering method. A gate electrode is obtained by patterning this titanium film. Further, by an anodic oxidation method, an anodic oxidation film with a thickness of 200 nm is formed on the exposed surface of the titanium film pattern.

This anodic oxidation film has a function to protect the surface of the gate electrode electrically and physically. Besides, in the subsequent step, the film serves to form a high resistance region called an offset region adjacent to a channel region.

Next, doping of phosphorus is carried out with the gate electrode and the anodic oxidation film therearound as masks. This phosphorus serves as a dopant for determining a source region and a drain region.

By carrying out the doping of phosphorus, the source and drain regions are formed in a self-aligning manner. The dosage of phosphorus in the present embodiment is such that a dose of $5 \times 10^{14}$ ions/cm$^2$ is introduced by using an ion doping apparatus. Next, phosphorus is activated by a laser. Laser irradiation was carried out by the method shown in Embodiment 1. The energy density of the laser beam was made about 200 mJ/cm$^2$. Since a suitable energy density in this process is different according to the kind of laser, method of irradiation, and state of the semiconductor film, it is adjusted according to those. By the laser irradiation, the sheet resistance of the source and drain regions was lowered to about 1 KΩ/□.

Next, as an interlayer insulating film, a silicon nitride film with a thickness of 150 nm is formed by a plasma CVD method, and further, an acrylic resin film is formed. The film thickness of the acrylic resin film is made 700 nm at the lowest portion. The resign film is used to flatten the surface.

Other than acryl, a material such as polyimide, polyamide, polyimide amide, or epoxy may be used. This resin film may be structured as a laminate film.

Next, contact holes are formed, and a source electrode and a drain electrode are formed. In this way, an N-channel TFT is completed. In the present embodiment, since phosphorus was introduced in the source and drain regions, the N-channel TFT was manufactured. If a P-channel type is manufactured, it is appropriate that doping of boron is carried out instead of phosphorus.

In the case where, for example, a liquid crystal display was manufactured by using TFTs manufactured by using the present invention, as compared with the prior art, it was possible to form the display in which a stain due to laser processing was inconspicuous.

Embodiment 5

This embodiment of the present invention will be described with reference to FIGS. 17A to 19C. Here, a description will be made on a method of manufacturing a pixel portion of a liquid crystal display device using a semiconductor film obtained in the embodiments 1 to 3 and a driver circuit provided on the periphery of the pixel portion at the same time. However, for simplifying the description, with respect to the driver circuit, a CMOS circuit as a basic circuit of a shift register circuit, a buffer circuit, and the like, and an n-channel TFT forming a sampling circuit will be shown.

In FIG. 17A, it is desirable to use a glass substrate or a quartz substrate as a substrate 3100. Other than those, a substrate obtained by forming an insulating film on the surface of a silicon substrate, a metal substrate, or a stainless substrate may be used. A plastic substrate may also be used so far as the heat resistance permits.

An under film 3101 made of an insulating film containing silicon (in this embodiment, this insulating film generically denotes a silicon oxide film, a silicon nitride film, or a silicon nitride oxide film) and having a thickness of 100 to 400 nm is formed by a plasma CVD method or a sputtering method on the surface of the substrate 3100 on which a TFT is to be formed. Incidentally, the silicon nitride oxide film in this embodiment is an insulating film expressed by SiOxNy, and denotes an insulating film containing silicon, oxygen, and nitrogen at a predetermined ratio.

In this embodiment, the under film 3101 was formed of a two-layer structure of a silicon nitride oxide film with a thickness of 25 to 100 nm, here, 50 nm, and a silicon oxide film with a thickness of 50 to 300 nm, here, 150 nm. The under film 3101 is provided to prevent impurity contamination from the substrate, and in the case where the quartz substrate is used, the under film does not have to be always provided.

Next, a semiconductor film (in this embodiment, an amorphous silicon film (not shown)) containing amorphous structure and having a thickness of 20 to 100 nm is formed on the under film 3101 by a known film formation method. Incidentally, the semiconductor film containing amorphous structure includes an amorphous semiconductor film and a microcrystalline semiconductor film, and also, a compound semiconductor film containing amorphous structure, such as an amorphous silicon germanium film.

Then, in accordance with a technique disclosed in Japanese Patent Application Laid-open No. Hei 7-130652 (corresponding to U.S. Pat. No. 5,643,826), a semiconductor film 3102 containing crystal structure (in this embodiment, a crystalline silicon film) is formed. The technique disclosed in the publication is crystallizing means using, when crystallizing an amorphous silicon film, a catalytic element (one kind or plural kinds of elements selected from nickel, cobalt, germanium, tin, lead, palladium, iron, and copper, representatively nickel) for promoting crystallization.

Specifically, the technique is such that a heat treatment is carried out in a state where a catalytic element is held on the surface of an amorphous silicon film, so that the amorphous silicon film is transformed into a crystalline silicon film. In this embodiment, although a technique disclosed in the embodiment 1 of the publication is used, a technique disclosed in the embodiment 2 may be used. Incidentally, although the crystalline silicon film includes a so-called single crystal silicon film and a polycrystalline silicon film, the crystalline silicon film formed in this embodiment is a silicon film including crystal grain boundaries (FIG. 17A).

It is desirable to carry out the step of crystallization in such a manner that although depending on a hydrogen content, the amorphous silicon film is preferably heated at 400 to 550° C. for several hours to carry out a dehydrogenating treatment so that the hydrogen content is lowered to 5 atom % or less. The amorphous silicon film may be formed by another manufacturing method such as a sputtering method or an evaporation method, but it is desirable that impurity elements such as oxygen and nitrogen is sufficiently reduced.

Here, since the under film and the amorphous silicon film can be formed by the same film forming method, both may be sequentially formed. Then the under film is prevented from being exposed to the atmosphere once after the under film is formed, so that pollution on the surface can be prevented, and it is possible to reduce fluctuation in characteristics of TFTs to be manufactured.

Next, by a method described in the embodiments 1 to 3, laser annealing is applied to the crystalline silicon film 3102 to form a crystalline silicon film 3103 in which the crystallinity is improved. As laser light, although pulsed oscillation or continuous-wave excimer laser light is desirable, continuous-wave argon laser light may be used (FIG. 17B).

In this embodiment, by using the optical system shown in the embodiment 2, pulsed oscillation excimer laser light is converted into linear light and a laser annealing step is carried out. The laser annealing condition is such that a XeCl gas is used as an excitation gas, treatment temperature is adjusted to room temperature, the frequency of pulsed oscillation is set to 30 Hz, and the density of laser energy is set to 250 to 500 mJ/cm$^2$ (representatively 350 to 400 mJ/cm$^2$).

The laser annealing step carried out in the above condition has effects to completely crystalize an amorphous region remaining after thermal crystallization, and to reduce defects or the like of a crystalline region which is already crystallized. Thus, this step may be called a step of improving crystallinity of a semiconductor film by light annealing or a step of promoting crystallization of a semiconductor film. Such effects can also be obtained by optimizing the condition of laser annealing. In this embodiment, such a condition is called a first annealing condition.

Next, a protection film 3104 for subsequent impurity addition is formed on the crystalline silicon film 3103. A silicon nitride oxide film or a silicon oxide film with a thickness of 100 to 200 nm (preferably 130 to 170 nm) is used as the protection film 3104. This protection film 3104 has meanings to prevent the crystalline silicon film from being directly exposed to plasma at impurity addition, and to enable delicate concentration control.

Then a resist mask 3105 is formed thereon, and an impurity element for giving p type (hereinafter referred to as a p-type impurity element) is added through the protection film 3104. As the p-type impurity element, representatively an element belonging to group 13, typically boron or gallium may be used. This step (called a channel doping step) is a step for controlling a threshold voltage of a TFT. Here, boron is added by an ion doping method in which diborane ($B_2H_6$) is not subjected to mass separation but is subjected to plasma excitation. Of course, an ion implantation method using mass separation may be used.

By this step, an impurity region 3106 containing the p-type impurity element (in this embodiment, boron) with a concentration of $1 \times 10^{15}$ to $1 \times 10^{18}$ atoms/cm$^3$ (representatively $5 \times 10^{16}$ to $5 \times 10^{17}$ atoms/cm$^3$) is formed. In this embodiment, an impurity region containing a p-type impurity element within at least the above concentration range is defined as a p-type impurity region (b) (FIG. 17C).

Next, the resist mask 3105 is removed, and resist masks 3107 to 3110 are newly formed. Then an impurity element for giving n type (hereinafter referred to as an n-type impurity element) was added to form impurity regions 3111 to 3113 exhibiting an n type. As the n-type impurity element, representatively an element belonging to group 15, and typically phosphorus or arsenic may be used (FIG. 17D).

The low concentration impurity regions 3111 to 3113 are impurity regions which are subsequently made to function as LDD regions in n-channel TFTs of a CMOS circuit and a sampling circuit. In the impurity regions formed here, the n-type impurity element with a concentration of $2 \times 10^{16}$ to $5 \times 10^{19}$ atoms/cm$^3$ (representatively $5 \times 10^{17}$ to $5 \times 10^{18}$ atoms/cm$^3$) is contained. In this embodiment, an impurity region containing an n-type impurity element within the above concentration range is defined as an n-type impurity region (b).

Here, phosphorus with a concentration of $1 \times 10^{18}$ atoms/cm$^3$ is added by an ion doping method in which phosphine ($PH_3$) is not subjected to mass separation but to plasma excitation. Of course, an ion implantation method using mass separation may be used. In this step, phosphorus is added to the crystalline silicon film through the protection film 3104.

Next, the protection film 3104 is removed, and an irradiation step of a laser beam is again carried out by a method described in the embodiments 1 to 3. In this embodiment, laser annealing is carried out by using the optical system described in the embodiment 2. Although pulsed oscillation or continuous-wave excimer laser light is desirable as the laser beam, continuous-wave argon laser light may be used. However, since an object thereof is activation of added impurity elements, it is preferable to make irradiation with energy at such a level that the crystalline silicon film is not melted. It is also possible to carry out the laser annealing step while the protection film 3104 is kept remaining (FIG. 17E).

In this embodiment, pulsed oscillation excimer laser light is converted into linear light and the laser annealing step was carried out. The laser annealing condition was such that a KrF gas is used as an excitation gas, treatment temperature is adjusted to room temperature, the frequency of pulsed oscillation is set to 30 Hz, and the density of laser energy is set to 100 to 300 mJ/cm$^2$ (representatively 150 to 250 mJ/cm$^2$).

The laser annealing step carried out under the above condition has effects to activate the added impurity elements for giving n type or p type and to recrystallize the semiconductor film which has been made amorphous at addition of the impurity elements. The above condition is preferably such that atomic arrangement is aligned without melting the semiconductor film, and the impurity elements are activated. This step may be called a step of activating an impurity element for giving n type or p type by laser annealing, a step of recrystallizing a semiconductor film, or a step of carrying out both at the same time. In this embodiment, such a condition will be referred to as a second annealing condition.

By this step, boundary portions of the n-type impurity regions (b) 3111 to 3113, that is, junction portions to intrinsic regions (the p-type impurity region (b) is also regarded as substantially intrinsic) existing around the n-type impurity regions (b) become definite. This means that at the point of time when a TFT is subsequently completed, the LDD region and a channel formation region can form a very excellent junction portion.

When the impurity element is activated by the laser beam, activation by a heat treatment may be employed together with it. In the case where activation by the heat treatment is carried out, the heat treatment at about 450 to 550° C. is appropriate in view of the heat resistance of the substrate.

Next, unnecessary portions of the crystalline silicon film are removed and island-like semiconductor films (hereinafter referred to as active layers) 3114 to 3117 are formed (FIG. 17F).

Figure 18A:
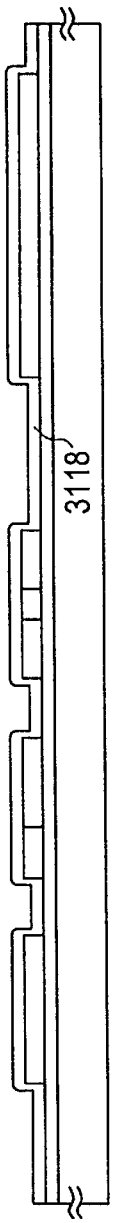
FIGS. 18A to 18F are vies showing manufacturing steps of the pixel circuit and the control circuit.

Next, a gate insulating film 3118 covering the active layers 3114 to 3117 is formed. It is appropriate that the gate insulating film 3118 is formed to have a thickness of 10 to 200 nm, preferably 50 to 150 nm. In this embodiment, a silicon nitride oxide film with a thickness of 115 nm is formed by a plasma CVD method using $N_2O$ and $SiH_4$ as a raw material (FIG. 18A).

Figure 18B:
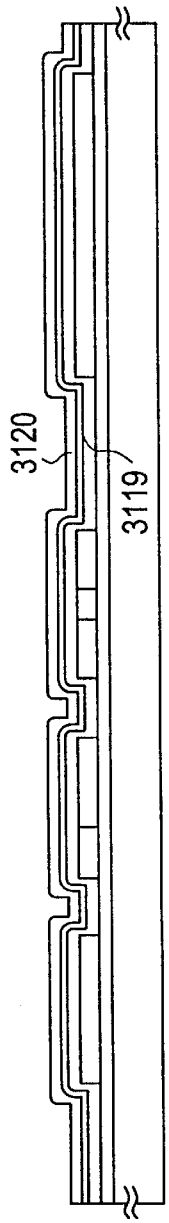

Next, a conductive film to become a gate wiring line is formed. Although the gate wiring line may be formed of a conductive film of a single layer, it is preferable to make a laminated film such as a two-layer or three-layer film according to necessity. In this embodiment, a laminated film made of a first conductive film 3119 and a second conductive film 3120 is formed (FIG. 18B).

Here, as the first conductive film 3119 and the second conductive film 3120, it is possible to use an element selected from tantalum (Ta), titanium (Ti), molybdenum (Mo), tungsten (W), chromium (Cr), and silicon (Si), a conductive film (representatively, tantalum nitride film, tungsten nitride film, titanium nitride film) containing mainly the foregoing element, or an alloy film containing a combination of the foregoing elements (representatively, Mo-W alloy, Mo-Ta alloy).

It is appropriate that the thickness of the first conductive film 3119 is 10 to 50 nm (preferably 20 to 30 nm), and the thickness of the second conductive film 3120 is 200 to 400 nm (preferably 250 to 350 nm). In this embodiment, a tungsten nitride (WN) film with a thickness of 50 nm is used as the first conductive film 3119, and a tungsten film with a thickness of 350 nm is used as the second conductive film 3120.

Although not shown, it is effective that a silicon film with a thickness of about 2 to 20 nm is previously formed under the first conductive film 3119. By this, it is possible to improve the adhesiveness of the conductive film formed thereon and to prevent oxidation.

Figure 18C:
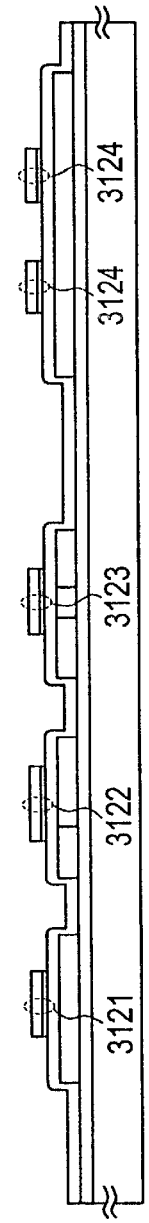

Next, the first conductive film 3119 and the second conductive film 3120 are etched at the same time to form gate wiring lines 3121 to 3124 with a thickness of 400 nm. At this time, the gate wiring lines 3122 and 3123 formed in the driver circuit are formed to overlap with a part of the n-type impurity regions (b) 3111 to 3113 through the gate insulating film. This overlapping portion subsequently becomes a Lov region. Although the gate wiring line 3124 is seen double in section, it is actually formed of one continuously connected pattern (FIG. 18C).

Figure 18D:
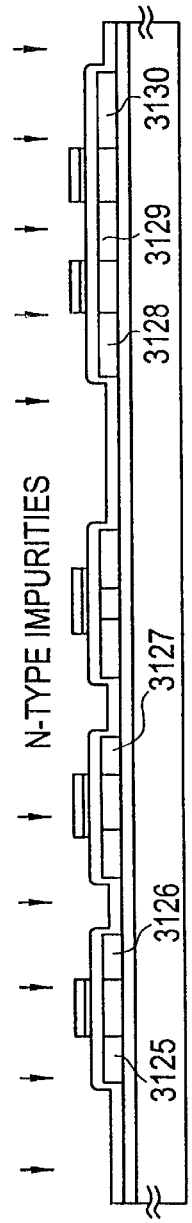

Next, an n-type impurity element (in this embodiment, phosphorus) is added by using the gate wiring lines 3121 to 3124 as masks in a self-aligning manner. It was adjusted such that phosphorus with a concentration of ½ to ⅒ (representatively ⅓ to ¼) of that of the n-type impurity region (b) (however, the concentration is 5 to 10 times as high as the concentration of boron added in the foregoing channel doping step, representatively $1\times10^{16}$ to $5\times10^{18}$ atoms/cm$^3$, typically $3\times10^{17}$ to $3\times10^{18}$ atoms/cm$^3$) is added to the thus formed impurity regions 3125 to 3130. Incidentally, in this embodiment, an impurity region containing an n-type impurity element within the above concentration range is defined as an n-type impurity region (c) (FIG. 18D).

Although phosphorus with a concentration of $1\times10^{16}$ to $5\times10^{18}$ atoms/cm$^3$ is added also to all the n-type impurity regions (b) except portions concealed with the gate wiring lines, since its concentration is very low, it does not affect the function as the n-type impurity region (b). Besides, although boron with a concentration of $1\times10^{15}$ to $1\times10^{18}$ atoms/cm$^3$ is already added in the n-type impurity regions (b) 3127 to 3130 at the channel doping step, in this step, since phosphorus with a concentration 5 to 10 times as high as boron contained in the p-type impurity region (b) is added, it is permissible to consider that boron does not affect the function of the n-type impurity region (b) in this case as well.

However, strictly, among the n-type impurity regions (b) 3111 to 3113, In contrast to the concentration of phosphorus in the portion overlapping with the gate wiring line keeps $2\times10^{16}$ to $5\times10^{19}$ atoms/cm$^3$, in the portion not overlapping with the gate wiring line, phosphorus with a concentration of $1\times10^{16}$ to $5\times10^{18}$ atoms/cm$^3$ is added thereto, so that phosphorus with a slightly high concentration is contained.

Figure 18E:
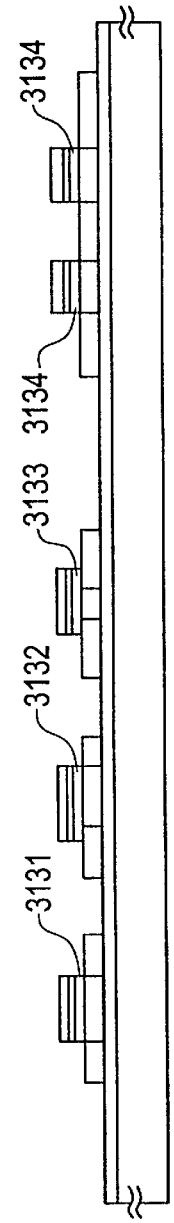

Next, the gate insulating film 3118 is etched with the gate wiring lines 3121 to 3124 as masks in a self-aligning manner. A dry etching method is used as etching, and a CHF$_3$ gas is used as an etching gas. However, it is not necessary to limit the etching gas to this. In this way, gate insulating films 3131 to 3134 are formed under the gate wiring lines (FIG. 18E).

The active layers are exposed in this way, so that it is possible to lower an acceleration voltage when an adding step of impurity elements is next carried out. Besides, since a necessary dosage can be made low, a throughput is improved. Of course, the gate insulating film may not be etched but remained to form an impurity region by through doping.

Figure 18F:
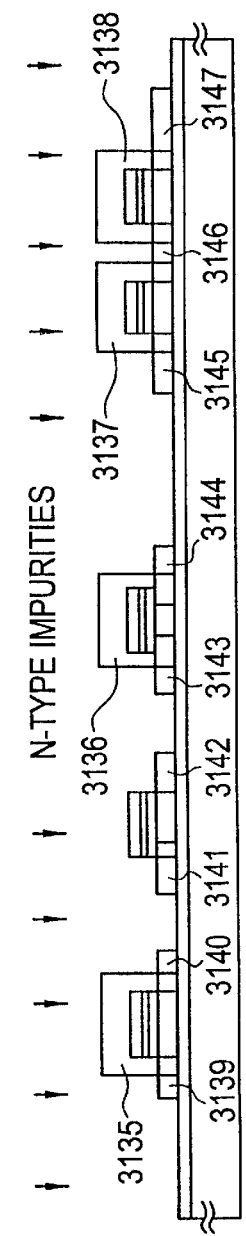

Next, resist masks 3135 to 3138 to cover the gate wiring lines are formed, and an n-type impurity element (in this embodiment, phosphorus) is added to form impurity regions 3139 to 3147 containing phosphorus with a high concentration. Also in this case, an ion doping method (of course, an ion implantation method may be used) using phosphine (PH$_3$) is used, and the concentration of phosphorus in the regions is $1\times10^{20}$ to $1\times10^{21}$ atoms/cm$^3$ (representatively $2\times10^{20}$ to $5\times10^{21}$ atoms/cm$^3$) (FIG. 18F).

Incidentally, in this embodiment, an impurity region containing an n-type impurity element within the above concentration range is defined as an n-type impurity region (a). Although phosphorus or boron added in the former step is already contained in the regions where the impurity regions 3139 to 3147 are formed, since phosphorus with a sufficiently high concentration is added, the influence of phosphorus or boron added in the former step does not have to be considered. Thus, in this embodiment, it does not matter if the impurity regions 3139 to 3147 are rephrased by n-type impurity regions (a).

Next, the resist masks 3135 to 3139 are removed, and a resist mask 3148 is newly formed. Then a p-type impurity element (in this embodiment, boron) is added to form impurity regions 3149 and 3150 containing boron with a high concentration. Here, boron with a concentration of $3\times10^{20}$ to $3\times10^{21}$ atoms/cm$^3$ (representatively $5\times10^{20}$ to $1\times10^{21}$ atoms/cm$^3$) is added by an ion doping method using diborane (B$_2$H$_6$) (of course, an ion implantation method may be used). Incidentally, in this embodiment, an impurity region containing a p-type impurity element within the above concentration range is defined as a p-type impurity region (a) (FIG. 19A).

Although phosphorus with a concentration of $1\times10^{20}$ to $1\times10^{21}$ atoms/cm$^3$ is added in a part of the impurity regions 3149 and 3150 (foregoing n-type impurity regions (a) 3139 and 3140), boron added here is added with a concentration at least 3 times as high as that. Thus, the previously formed n-type impurity regions are completely inverted into p-type, and function as p-type impurity regions. Thus, in this embodiment, it does not matter if the impurity regions 3149 and 3150 are rephrased by p-type impurity regions (a).

Next, after the resist mask 3148 is removed, a first interlayer insulating film 3151 is formed. The first interlayer insulating film 3151 is appropriately formed of an insulating film containing silicon, specifically, a silicon nitride film, a silicon oxide film, a silicon nitride oxide film, or a laminated film containing a combination of those films. The film thickness is appropriately 100 to 400 nm. In this embodiment, a silicon nitride oxide film (concentration of nitrogen is 25 to 50 atomic %) having a thickness of 200 nm and formed by a plasma CVD method with SiH$_4$, N$_2$O, NH$_3$ as a raw material gas is used.

Thereafter, a heat treatment step for activating the n-type or p-type impurity element added in each concentration is carried out. This step can be carried out by a furnace annealing method, a laser annealing method, or a rapid thermal annealing method (RTA method). Here, although an activating step is carried out by the furnace annealing method, it is also effective to use laser annealing described in the embodiments 1 to 3. A heat treatment is performed at 300 to 650° C., preferably 400 to 550° C., here, 550° C. for four hours in a nitrogen atmosphere (FIG. 19B).

At this time, in this embodiment, the catalytic elements (in this embodiment, nickel) used for crystallization of the amorphous silicon film move in the directions indicated by arrows, and are captured (gettered) in the regions which are formed in the above step of FIG. 18F and containing phosphorus with a high concentration. This is a phenomenon caused by a gettering effect of phosphorus for a metal element, and as a result, in subsequent channel formation regions 3152 to 3156, the concentration of the catalytic element became $1 \times 10^{17}$ atoms/cm$^3$ or less (preferably $1 \times 10^{16}$ atoms/cm$^3$ or less).

Conversely, in the regions which became gettering sites of the catalytic element (regions where the impurity regions 3139 to 3147 are formed in the step of FIG. 18F), the catalytic element with a high concentration is segregated and the catalytic element with a concentration of $5 \times 10^{18}$ atoms/cm$^3$ or more (representatively, $1 \times 10^{19}$ to $5 \times 10^{20}$ atoms/cm$^3$) come to exist.

Further, a heat treatment at 300 to 450° C. for 1 to 12 hours is carried out in an atmosphere containing hydrogen of 3 to 100%, and a step of hydrogenating the active layers is carried out. This step is a step of terminating dangling bonds in the semiconductor layer by thermally excited hydrogen. As other means of hydrogenating, plasma hydrogenating (using hydrogen excited by plasma) may be carried out.

After the activating step is completed, a second interlayer insulating film 3157 with a thickness of 500 nm to 1.5 μm is formed on the first interlayer insulating film 3151. In this embodiment, a silicon oxide film with a thickness of 800 nm is formed as the second interlayer insulating film 3157 by a plasma CVD method. In this way, an interlayer insulating film having a thickness of 1 μm and made of the first interlayer insulating film (silicon nitride oxide film) 3151 and the second interlayer insulating film (silicon oxide film) 3157 is formed.

As the second interlayer insulating film 3157, an organic resin film of polyimide, acrylic resin, polyamide, polyimideamide, BCB (benzocyclobutene) or the like may be used.

Thereafter, a contact hole reaching a source region or drain region of each TFT is formed, and source wiring lines 3158 to 3161, and drain wiring lines 3162 to 3165 are formed. Although not shown, for the purpose of forming the CMOS circuit, the drain wiring lines 3162 and 3163 are connected as the same wiring line. Besides, although not shown, in this embodiment, this electrode is made to have a three-layer structure laminated film in which a Ti film with a thickness of 100 nm, an aluminum film containing Ti and having a thickness of 300 nm, and a Ti film having a thickness of 150 nm are continuously formed by a sputtering method.

Next, as a passivation film 3166, a silicon nitride film, a silicon oxide film, or a silicon nitride oxide film is formed to have a thickness of 50 to 500 nm (representatively, 200 to 300 nm). At this time, in this embodiment, prior to formation of the film, a plasma treatment using a gas containing hydrogen, such as H$_2$ or NH$_3$, is carried out, and a heat treatment is carried out after the film formation. Hydrogen excited by this preliminary treatment is supplied to the first and second interlayer insulating films. By carrying out the heat treatment in this state, the film quality of the passivation film 3166 is improved, and it is possible to effectively hydrogenate the active layer since hydrogen added in the first and second interlayer insulating films is diffused to the under layer side.

Besides, after the passivation film 3166 is formed, a hydrogenating step may be further carried out. For example, it is appropriate that a heat treatment at 300 to 450° C. for 1 to 12 hours is carried out in an atmosphere containing hydrogen of 3 to 100%. Alternatively, also when a plasma hydrogenating method was used, the same effect is obtained. Here, at a position where a contact hole for connecting a pixel electrode to the drain wiring line is subsequently formed, an opening portion may be formed in the passivation film 3166.

Thereafter, a third interlayer insulating film 3167 made of organic resin and having a thickness of about 1 μm is formed. As the organic resin, polyimide, acryl, polyamide, polyimideamide, BCB (benzocyclobutene) or the like can be used. As merits of using the organic resin film, there are cited a point that a film forming method is simple, a point that parasitic capacity can be reduced since relative dielectric constant is low, a point that excellent flatness is obtained, and the like. Incidentally, an organic resin film other than those mentioned above, organic SiO compound, and the like can also be used. Here, polyimide of a type that is thermally polymerized after application to the substrate is used and fired at 300° C. to form the film.

Next, in the region to be a pixel portion, a shielding film 3168 is formed on the third interlayer insulating film 3167. Incidentally, in this embodiment, the word "shielding film" is used to carry the meaning of shielding against light and electromagnetic waves.

As the shielding film 3168, a film made of an element selected from aluminum (Al), titanium (Ti), and tantalum (Ta) or a film containing either one of those elements as its main ingredient is formed to have a thickness of 100 to 300 nm. In this embodiment, an aluminum film containing titanium of 1 wt % and having a thickness of 3125 nm was formed.

Incidentally, when an insulating film made of a silicon oxide film or the like and having a thickness of 5 to 50 nm is formed on the third interlayer insulating film 3167, it is possible to improve the adhesiveness of the shielding film formed thereon. Besides, when a plasma treatment using a CF$_4$ gas is applied to the surface of the third interlayer insulating film 3167 formed of organic resin, it is possible to improve the adhesiveness of the shielding film formed on the film owing to surface reforming.

It is also possible to form not only the shielding film but other connection wiring lines by using the aluminum film containing titanium. For example, connecting wiring lines for connecting circuits in the driver circuit can be formed. However, in that case, it is necessary to form a contact hole in the third interlayer insulating film prior to film formation with a raw material for forming the shielding film or the connecting wiring line.

Next, an oxide 3169 with a thickness of 20 to 100 nm (preferably 30 to 50 nm) is formed on the surface of the shielding film 3168 by an anodic oxidation method or a plasma oxidation method (in this embodiment, anodic oxidation method). In this embodiment, since the film mainly containing aluminum is used as the shielding film 3168, an aluminum oxide film (alumina film) is formed as the anodic oxide 3169.

At this anodic oxidation treatment, an ethylene glycol tartrate solution with a sufficiently low alkaline ion concentration is prepared. This is a mixture solution in which an ammonium tartrate aqueous solution of 15% and ethylene glycol are mixed at 2:8, and ammonia water is added to this solution to make adjustment so that pH becomes 7±0.5. Then a platinum electrode as a cathode is provided in this solution, the substrate on which the shielding film 3168 is formed is immersed in the solution, and a constant (several mA to several tens mA) direct current is made to flow with the shielding film 3168 as an anode.

Although a voltage between the cathode and the anode in the solution was changed with a lapse of time in accordance with the growth of an anodic oxide, the voltage is raised at a voltage rising rate of 100 V/min while the constant current is kept, and the anodic oxidation treatment is ended when the voltage reached reachable voltage of 45 V. In this way, it is possible to form an anodic oxide 3169 with a thickness of about 50 nm on the surface of the shielding film 3168. As a result, the thickness of the shielding film 3168 becomes 90 nm. Incidentally, numerical values relating to the anodic oxidation method shown here are merely examples, and optimum values can be naturally changed by the size and the like of a component to be manufactured.

Besides, although such a structure is adopted here that the insulating film is provided only on the surface of the shielding film by using the anodic oxidation method, the insulating film may be formed by a vapor phase method such as a plasma CVD method, a thermal CVD method, or a sputtering method. In that case as well, it is preferable to set the film thickness to 20 to 100 nm (preferably 30 to 50 nm). Besides, a silicon oxide film, a silicon nitride film, a silicon nitride oxide film, a DLC (Diamond like carbon) film, or an organic resin film may be used. Further, a laminated film of a combination of these may be used.

Next, a contact hole reaching the drain wiring line 3165 is formed in the third interlayer insulating film 3167 and the passivation film 3166, and a pixel electrode 3170 is formed. Incidentally, pixel electrodes 3171 and 3172 are pixel electrodes of adjacent different pixels, respectively. It is appropriate that in the case where a transmission type liquid crystal display device is formed, a transparent conductive film is used for the pixel electrodes 3170 to 3172, and in the case where a reflection type liquid crystal display device is formed, a metal film is used. Here, for the purpose of forming the transmission type liquid crystal display device, an indium-tin oxide (ITO) film with a thickness of 110 nm is formed by a sputtering method.

At this time, the pixel electrode 3170 and the shielding film 3168 overlaps with each other through the anodic oxide 3169, so that a holding capacitance (capacitance storage) 3173 is formed. In this case, it is desirable that the shielding film 3168 is set at a floating state (electrically isolated state) or to a fixed potential, preferably to a common potential (intermediate potential of an image signal transmitted as data).

In this way, an active matrix substrate including the driver circuit and the pixel portion on the same substrate is completed. In FIG. 19C, a p-channel TFT 3301, and n-channel TFTs 3302 and 3303 are formed in the driver circuit, and a pixel TFT 3304 made of an n-channel TFT is formed in the pixel portion.

In the p-channel TFT 3301 of the driver circuit, a channel formation region 3201, a source region 3202, and a drain region 3203 are formed of the p-type impurity regions (a), respectively. However, actually, there exists a region containing phosphorus with a concentration of $1\times10^{20}$ to $1\times10^{21}$ atoms/cm$^3$ in a part of the source region or drain region. Besides, in that region, there exists a catalytic element gettered in the step of FIG. 19B and having a concentration of $5\times10^{18}$ atoms/cm$^3$ or more (representatively, $1\times10^{19}$ to $5\times10^{20}$ atoms/cm$^3$).

In the n-channel TFT 3302, a channel formation region 3204, a source region 3205, a drain region 3206, and a region 3207 disposed at one side of the channel formation region (drain region side) and overlapping with the gate wiring line through the gate insulating film (in this embodiment, such a region is referred to as a Lov region. The "ov" is affixed to denote "overlap") are formed. At this time, the Lov region 3207 contained phosphorus with a concentration of $2\times10^{16}$ to $5\times10^{19}$ atoms/cm$^3$, and is formed to totally overlap with the gate wiring line.

In the n-channel TFT 3303, a channel formation region 3208, a source region 3209, a drain region 3210, and LDD regions 3211 and 3212 on both sides of the channel formation region are formed. In this structure, since a part of the LDD regions 3211 and 3212 is disposed to overlap with the gate wiring line, a region (Lov region) which overlaps with the gate wiring line through the gate insulating film and a region which does not overlap with the gate wiring line (in this embodiment, such a region will be referred to as Loff region. The "off" is affixed to denote "offset") are realized.

Figure 24:
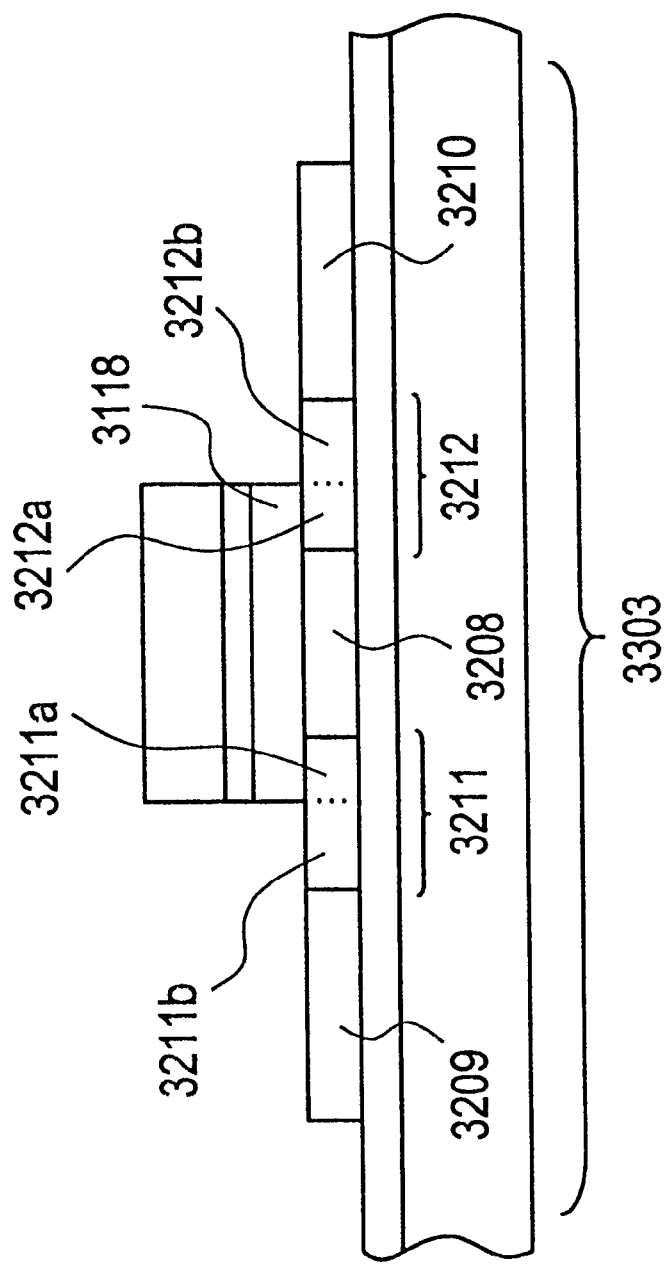
FIG. 24 is a view showing an LDD structure of an n-channel TFT.

A sectional view shown in FIG. 24 is an enlarged view showing the state in which manufacture of the n-channel TFT 3303 shown in FIG. 19C proceeds up to the step of FIG. 19B. As shown here, the LDD region 3211 can be divided into a Lov region 3211*a* and a Loff region 3211*b*. While the Lov region 3211*a* contains phosphorus with a concentration of $2\times10^{16}$ to $5\times10^{19}$ atoms/cm$^3$, the Loff region 3211*b* contains phosphorus with a concentration 1 to 2 times (representatively 1.2 to 1.5 times) as high as that.

In the pixel TFT 3304, channel formation regions 3213 and 3214, a source region 3215, a drain region 3216, Loff regions 3217 to 3220, and an n-type impurity region (a) 3221 being in contact with the Loff regions 3218 and 3219 are formed. At this time, the source region 3215 and the drain region 3216 are formed of the n-type impurity regions (a) respectively, and the Loff regions 3217 to 3220 are formed of the n-type impurity regions (c).

In this embodiment, the structure of a TFT forming each circuit is optimized in accordance with a circuit specification required by the pixel portion and the driver circuit, and it is possible to improve the operation performance and reliability of the semiconductor device. Specifically, in the n-channel TFT, the arrangement of the LDD region is made different in accordance with the circuit specification, and one of the Lov region and the Loff region is appropriately used, so that a TFT structure in which importance is attached to high speed operation or hot carrier measures, or a TFT structure in which importance is attached to low off current operation are realized.

For example, in the case of an active matrix type liquid crystal display device, the n-channel TFT 3302 is suitable for a driver circuit such as a shift register circuit, a frequency dividing circuit, a signal dividing circuit, a level shifter circuit, and a buffer circuit, in which importance is attached to high speed operation. That is, the Lov region is disposed at only one side (drain region side) of the channel formation region, so that such a structure is formed that a resistance component is reduced to the utmost degree and importance is attached to hot carrier measures. This is because in the case of the foregoing circuit group, the functions of the source region and the drain region are not different from each other, and the direction of movement of carriers (electrons) is constant. However, as the need arises, the Lov region can be disposed at both sides of the channel formation region.

The n-channel TFT 3303 is suitable for a sampling circuit (sample-hold circuit) in which importance is attached to both hot carrier measures and low off current operation. That is, the Lov region is disposed as the hot carrier measures, and the Loff region is disposed to realize the low off current operation. In the sampling circuit, the functions of the source region and the drain region are inverted and the moving direction of carriers is changed by 180°, so that it is necessary to make such a structure that axial symmetry is established with respect to the gate wiring line. Incidentally, according to circumstances, there can be a case where only the Lov region exists.

The n-channel TFT 3304 is suitable for the pixel portion and the sampling circuit (sample-hold circuit) in which importance is attached to low off current operation. That is, the Lov region which can become a factor to increase an off current value is not disposed, but only the Loff region is disposed so that the low off current operation is realized. Besides, the LDD region with a concentration lower than that of the LDD region of the driver circuit is used as the Loff region, so that such measures are adopted that even if an on current value is lowered a little, an off current is thoroughly lowered. Further, it has been ascertained that the n-type impurity region (a) 3221 is very effective in lowering an off current value.

It is appropriate that as against the channel length of 3 to 7 μm, the length (width) of the Lov region 3207 of the n-channel TFT 3302 is 0.5 to 3.0 μm, representatively 1.0 to 1.5 μm. Besides, it is appropriate that the length (width) of the Lov regions 3211*a* and 3212*a* of the n-channel TFT 3303 is 0.5 to 3.0 μm, representatively 1.0 to 1.5 m, and the length (width) of the Loff regions 3211*b* and 3212*b* is 1.0 to 3.5 μm, representatively 1.5 to 2.0 μm. Besides, it is appropriate that the length (width) of the Loff regions 3217 to 3220 provided in the pixel TFT 3304 is 0.5 to 3.5 μm, representatively 2.0 to 2.5 μm.

Further, one of the features of the present invention is that the p-channel TFT 3301 is formed in a self-aligning manner, and the n-channel TFTs 3302 to 3304 are formed in a nonself-aligning manner.

Besides, in this embodiment, an alumina film with a relative dielectric constant of as high as 7 to 9 is used as the dielectric of the holding capacitance, so that it is possible to reduce an area for forming required capacitance. Moreover, the shielding film formed on the pixel TFT functions as one of electrodes of the holding capacitance as in this embodiment, so that it is possible to improve the opening ratio of an image display portion of an active matrix type liquid crystal display device.

Incidentally, the present invention is not necessarily limited to the structure of the holding capacitance shown in this embodiment. For example, the structure of a holding capacitance disclosed in Japanese Patent Application No. Hei 9-316567 or No. Hei 10-254097 by the present applicant can also be used.

Figure 20:
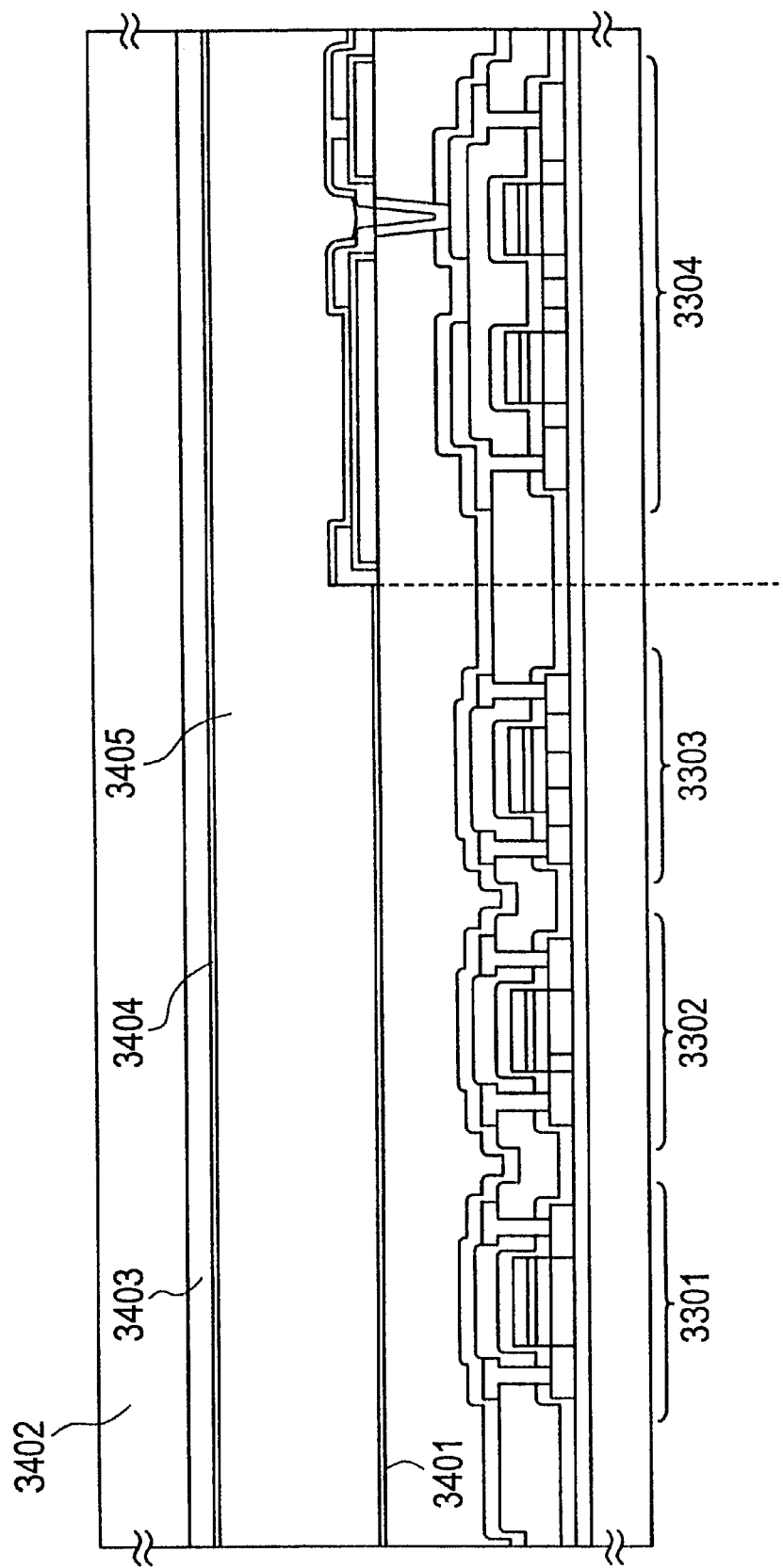
FIG. 20 is a sectional structural view of an active matrix type liquid crystal display device.

As shown in FIG. 20, an oriented film 3401 is formed on the substrate in the state of FIG. 19C. In this embodiment, a polyimide film was used as the oriented film. A transparent conductive film 3403 and an oriented film 3404 are formed on an opposite substrate 3402. A color filter and a shielding film may be formed on the opposite substrate as the need arises.

Next, after the oriented film is formed, a rubbing treatment is applied so that liquid crystal molecules are oriented with some uniform pre-tilt angle. Then the active matrix substrate on which the pixel portion and the driver circuit are formed is bonded to the opposite substrate by a well-known cell assembling step through a sealing material, a spacer (both not shown), and the like. Thereafter, a liquid crystal 3405 was injected between the substrates, and they are completely sealed with an end-sealing material (not shown). It is appropriate that a well-known liquid crystal material is used as the liquid crystal. In this way, the active matrix type liquid crystal display device as shown in FIG. 20 is completed.

Figure 21:
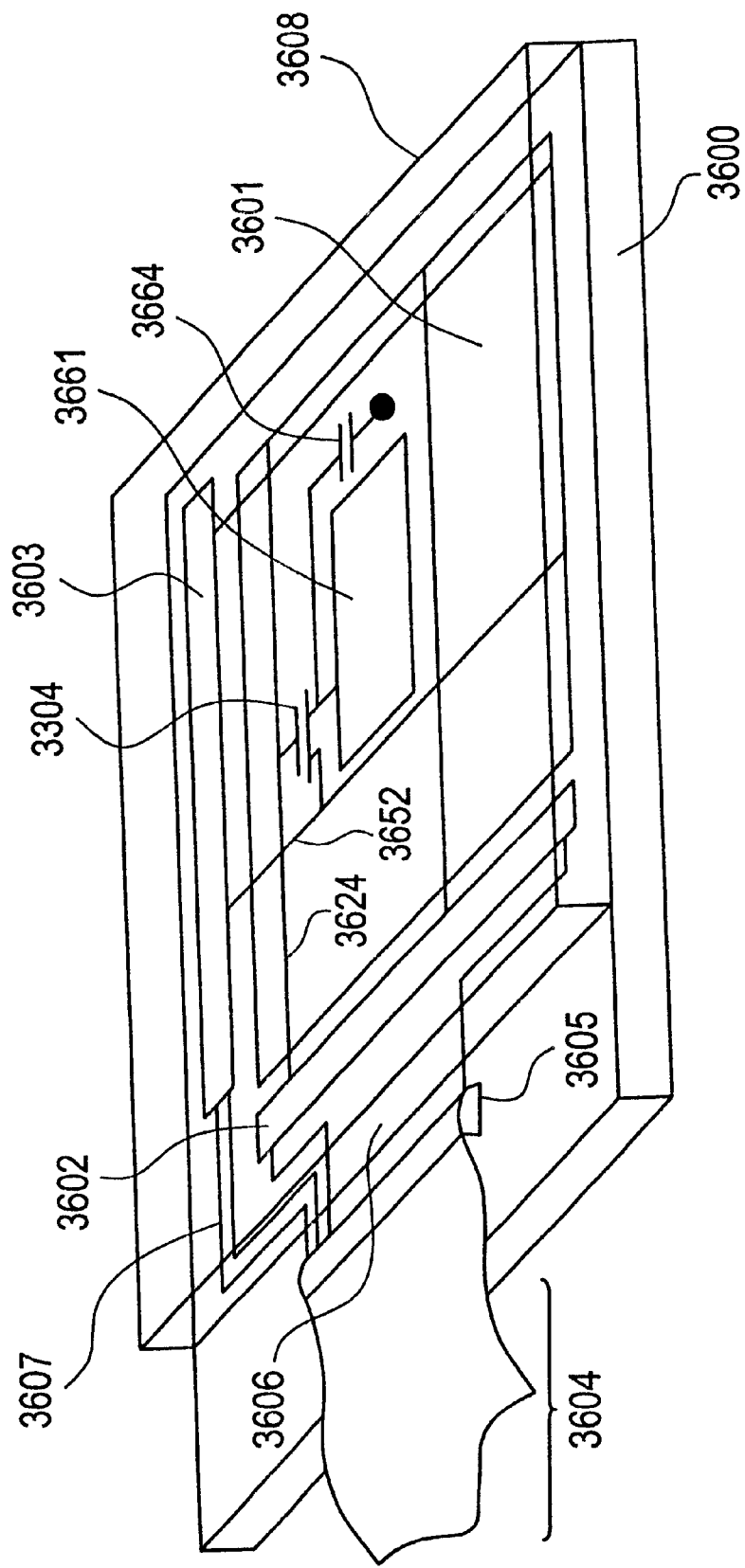
FIG. 21 is a perspective view of an active matrix type liquid display device.

Next, the structure of this active matrix type liquid crystal display device will be described with reference to a perspective view of FIG. 21. For the purpose of making FIG. 21 correspond to sectional structural views of FIGS. 17A to 19C, common reference symbols are used. An active matrix substrate comprises a pixel portion 3601, a scanning (gate) signal driver circuit 3602, an image (source) signal driver circuit 3603, which are formed on a glass substrate 3600. A pixel TFT 3304 of the pixel portion 3601 is an n-channel TFT, and the driver circuit provided on the periphery is constituted of a CMOS circuit as a base. The pixel portion 3601 also includes a pixel electrode 3661 and a holding capacitor 3664. The scanning signal driver circuit 3602 and the image signal driver circuit 3603 are connected to the pixel portion 3601 through a gate wiring line 3624 and a source wiring line 3652, respectively. Besides, there are provided connection wiring lines 3606 and 3607 extending from an external input/output terminal 3605 to which an FPC 3604 is connected to an input/output terminal of the driver circuit. 3608 denotes an opposite substrate.

Embodiment 6

CMOS circuits and pixel active matrix circuits produced by the embodiments of the present invention can be applied to a plurality of electro-optical devices (e.g. an active matrix type liquid crystal display, an active matrix type EL display, and an active matrix type EC display). That is, the present invention can be carried out for all the electric apparatus including such the electro-optical devices as display media.

As such electronic apparatus, a video camera, a digital camera, a projector (rear type or front type), a head mount display (a goggle type display), a car navigation system, a personal computer, a portable information terminal (mobile computer, portable telephone, electric book, etc.) and the like are enumerated. Examples of those are shown in FIGS. 22A to 22F and 23A to 23D.

Figure 22A:
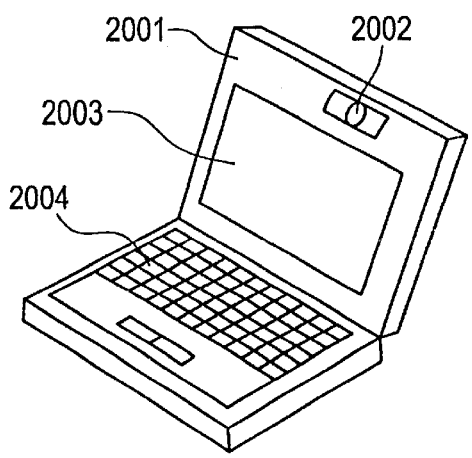
FIGS. 22A to 22F are electric apparatuses including the present invention.

FIG. 22A shows a personal computer which is constituted by a main body 2001, an image input portion 2002, a display device 2003, and a keyboard 2004. The present invention can be applied to the image input portion 2002, the display device 2003, and other signal control circuits.

Figure 22B:
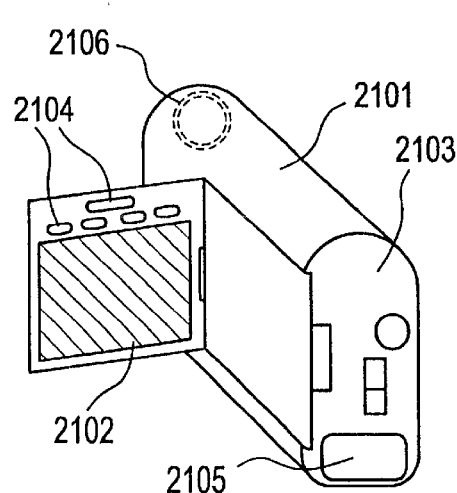

FIG. 22B shows a video camera which is constituted by a main body 2101, a display device 2102, an audio input portion 2103, an operation switch 2104, a battery 2105, and an image receiving portion 2106. The present invention can be applied to the display device 2102, the audio input portion 2103, and other signal control circuits.

Figure 22C:
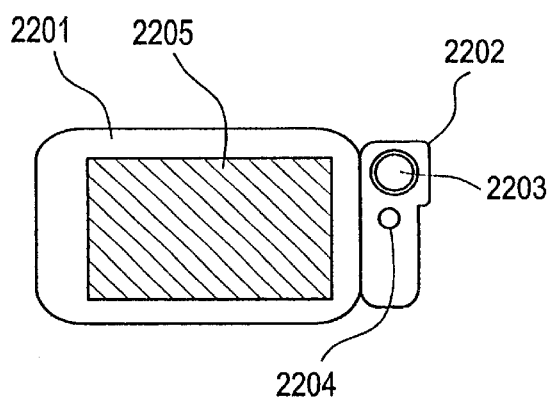

FIG. 22C shows a mobile computer which is constituted by a main body 2201, a camera portion 2202, an image receiving portion 2203, an operation switch 2204, and a display device 2205. The present invention can be applied to the display device 2205 and other signal control circuits.

Figure 22D:
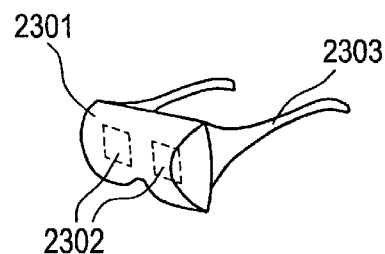

FIG. 22D shows a goggle type display which is constituted by a main body 2301, a display device 2302, and an arm portion 2303. The present invention can be applied to the display device 2302 and other signal control circuits.

Figure 22E:
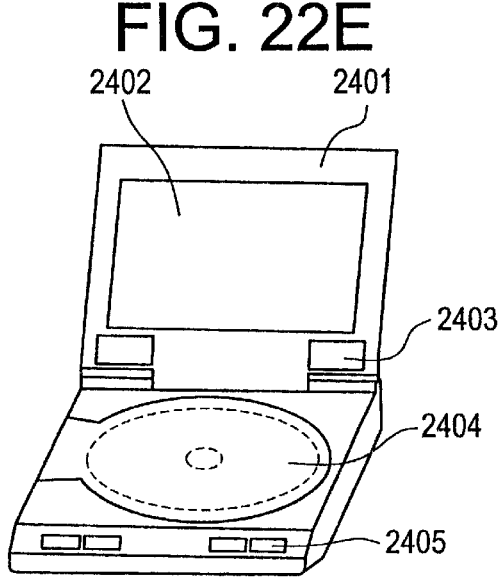

FIG. 22E shows a player apparatus which is equipped with a recording medium for recording a program (hereinafter, called "a recording medium"). The player apparatus is constituted by a main body 2401, a display device 2402, a speaker portion 2403, a recording medium 2404, an operation switch 2405 and an eternal input portion 2406. This apparatus includes a DVD (digital Versatile Disc), a CD and the like as the recording medium for appreciating music and movie, playing a game, and Internet. The present invention can be applied to the display device 2402 and other signal control circuits.

Figure 22F:
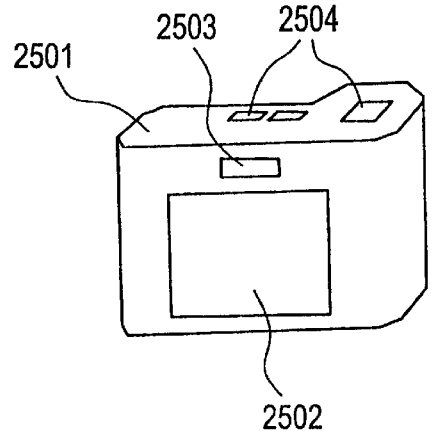

FIG. 22F shows a digital camera which is constituted by a main boy 2501, a display device 2502, an eyepiece portion 2503, an operation switch 2504 and an image receiving portion (not shown). The present invention can be applied to the display device 2502 and other signal control circuits.

Figure 23A:
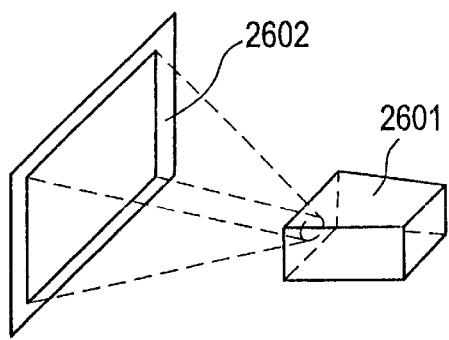
FIGS. 23A to 23D are electric apparatuses including the present invention.

FIG. 23A shows a front type projector which is constituted by a light source optical system and a display device 2601, and a screen 2602. The present invention can be applied to the display device and other signal control circuits.

Figure 23B:
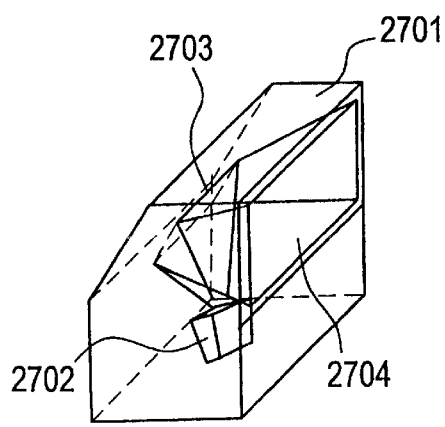

FIG. 23B shows a rear type projector which is constituted by a main body 2701, a light source optical system and a display device 2702, a mirror 2703 and a screen 2704. The present invention can be applied to the display device and other signal control circuits.

Figure 23C:
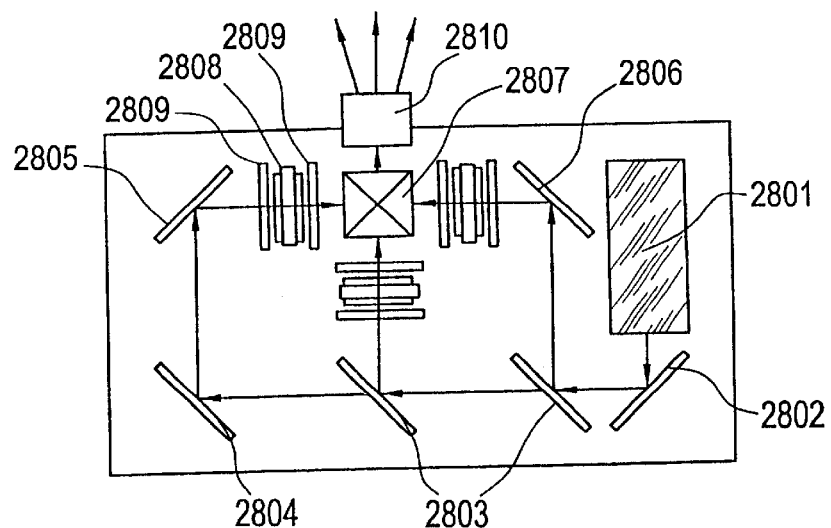

FIG. 23C shows an example structure of a light source optical system and a display device 2601 in FIG. 23A, or 2702 in FIG. 23B. Each of numerals 2601 and 2702 includes a light source optical system 2801, mirrors 2802, 2804–2806, a dichroic mirror 2803, a prism 2807, a display device 2808, a phase difference plate 2809, and a projection optical system 2810. The projection optical system 2810 is constituted by a plurality of optical lenses equipped with a projection lens. Such a projection system as shown in FIG. 23C is called a three-plate type since this structure includes three plates of display devices. However the display device is not specifically limited by the three-plate type, for example, it may be a single-plate type. Further, it is proper for a researcher to form, in an optical path indicated by an arrow in FIG. 23C, an optical lens, a film with a polarizing characteristics, a film to control a phase difference, an IR film, etc.

Figure 23D:
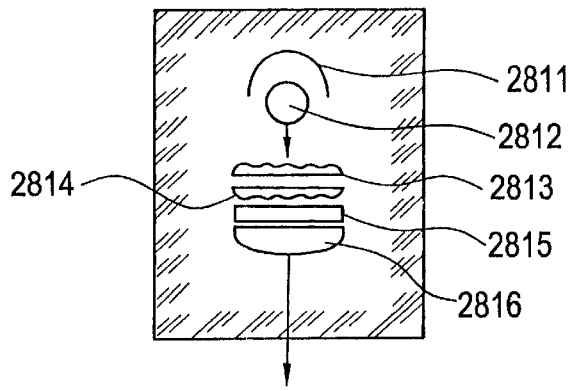

FIG. 23D shown an example structure of a light source optical system 2801 in FIG. 23C. In this embodiment, the light source optical system 2801 includes a reflector 2811, a light source 2812, lens arrays 2813 and 2814, a polarizing conversion element 2815 and a condenser lens 2816. However, the present invention is not specifically limited by this embodiment because it is just an example. The number of the light source may be 2 or more. Also, for example, in an optical path, an optical lens, a film with a polarizing characteristics, a film to control a phase difference, an IR film, etc. can be properly formed.

As described above, the present invention can be applied in a large range, so that it is possible to apply to any electric apparatus in every field. In addition, the electric apparatus in the instant invention can be realized by using any structure combined with Embodiments 1–5.

As described above, according to the present invention, it becomes possible to make uniform laser annealing to the whole surface of a processed substrate. As a result, it is possible to unify the characteristics of semiconductor devices in the surface of the substrate.

In the case where, for example, a liquid crystal display is manufactured by using TFTs manufactured by using the present invention, as compared with the prior art, it is possible to obtain the display in which a stain due to laser processing is inconspicuous.

What is claimed is:

1. A method for applying a laser beam to a surface to be irradiated, comprising steps of:

modulating an energy distribution of a laser beam at the surface to be irradiated in a way at least one edge of the energy distribution has a nearly vertical shape by using a cylindrical lens group comprising a plurality of cylindrical lenses arranged in the same direction, and each of the cylindrical lenses is cut along a basic plane of the cylindrical lenses; and scanning the surface to be irradiated with the modulated laser beam wherein the edge having the nearly vertical shape is made a front of the scanning.

2. A method according to claim 1, wherein at least one other edge of the energy distribution has an uneven shape.

3. A method for applying a laser beam to a surface to be irradiated, comprising steps of:

modulating an energy distribution of a laser beam in a width direction at the surface to be irradiated in a way at least one edge of the energy distribution has a nearly vertical shape by using a cylindrical lens group comprising a plurality of cylindrical lenses arranged in the same direction, and each of the cylindrical lenses is cut along a basic plane of the cylindrical lenses; and scanning the surface to be irradiated with the modulated laser beam wherein the edge having the nearly vertical shape is made a front of the scanning.

4. A method according to claim 3, wherein at least one other edge of the energy distribution has an uneven shape.

5. A method for manufacturing a semiconductor device comprising steps of:

forming a semiconductor layer over an insulating surface; and irradiating said semiconductor layer with a laser beam, an energy distribution of said laser beam at a surface of said semiconductor layer being modulated in a way at least one edge of the energy distribution has a nearly vertical shape by using a cylindrical lens group comprising a plurality of cylindrical lenses arranged in the same direction, and each of the cylindrical lenses is cut along a basic plane of the cylindrical lenses, wherein the edge having the nearly vertical shape is made a front of the scanning.

6. A method according to claim 5, wherein at least one other edge of the energy distribution has an uneven shape.

7. A method according to claim 5, wherein said semiconductor device comprises at least one thin film transistor.

8. A method according to claim 5, wherein said semiconductor device comprises an active matrix type display device.

9. A method according to claim 5, wherein said semiconductor device is an electronic apparatus selected from the group consisting of a video camera, a digital camera, a rear type projector, a front type projector, a head mount display, a goggle type display, a car navigation system, a personal computer, a portable information terminal, a mobile computer, a portable telephone, and an electric book.

10. A method for manufacturing a semiconductor device comprising steps of:

forming a semiconductor layer over an insulating surface; and irradiating said semiconductor layer with a laser beam, an energy distribution in a width direction of said laser beam at a surface of said semiconductor layer being modulated in a way at least one edge of the energy distribution has a nearly vertical shape by using a cylindrical lens group comprising a plurality of cylindrical lenses arranged in the same direction, and each of the cylindrical lenses is cut alone a basic plane of the cylindrical lenses, wherein the edge having the nearly vertical shape is made a front of the scanning.

11. A method according to claim 10, wherein at least one other edge of the energy distribution has an uneven shape.

12. A method according to claim 10, wherein said semiconductor device comprises at least one thin film transistor.

13. A method according to claim 10, wherein said semiconductor device comprises an active matrix type display device.

14. A method according to claim 10, wherein said semiconductor device is an electronic apparatus selected from the group consisting of a video camera, a digital camera, a rear type projector, a front type projector, a head mount display, a goggle type display, a car navigation system, a personal computer, a portable information terminal, a mobile computer, a portable telephone, and an electric book.

15. A method for applying a laser beam to a surface to be irradiated, comprising steps of:

generating a laser beam having an energy distribution at said surface to be irradiated;

modulating the energy distribution of the laser beam into a quadrilateral figure wherein at least one side of the quadrilateral energy distribution is perpendicular to two adjacent sides of energy distribution by using a cylindrical lens group comprising a plurality of cylindrical lenses arranged in the same direction, and each of the cylindrical lenses is cut along a basic plane of the cylindrical lenses; and scanning the surface to be irradiated with the modulated laser beam in a way the side perpendicular to the two adjacent sides is made a front of the scanning.

* * * * *